United States Patent
Ingram et al.

(10) Patent No.: US 10,842,080 B2
(45) Date of Patent: Nov. 24, 2020

(54) PLANT TRIMMING APPARATUS AND METHODS

(71) Applicant: Eteros Technologies Inc., Surrey (CA)

(72) Inventors: Erik Ingram, Abbotsford (CA); Aaron McKellar, Maple Ridge (CA); Joe Heywood, New Westminster (CA); Rudi Klossok, Coquitlam (CA)

(73) Assignee: Eteros Technologies Inc., Surrey (CA)

( * ) Notice: Subject to any disclaimer, the term of this patent is extended or adjusted under 35 U.S.C. 154(b) by 402 days.

(21) Appl. No.: 15/796,157

(22) Filed: Oct. 27, 2017

(65) Prior Publication Data

US 2019/0124851 A1 May 2, 2019

(51) Int. Cl.
*A01G 3/00* (2006.01)
*A01G 17/02* (2006.01)

(52) U.S. Cl.
CPC .............. *A01G 3/00* (2013.01); *A01G 17/023* (2013.01); *A01G 2003/005* (2013.01)

(58) Field of Classification Search
CPC ........ A01G 3/00; A01G 3/002; A01G 3/0435; A01G 17/023; A01G 17/02; A01G 17/026; A01G 2003/005; B26D 1/40; B26D 1/38; B26D 1/36; B26D 7/0691; B26D 7/2614; A23N 15/00–12
See application file for complete search history.

(56) References Cited

U.S. PATENT DOCUMENTS

| | | | |
|---|---|---|---|
| 2,063,067 A | 12/1936 | Waller | |
| 3,073,100 A | 1/1963 | Kingsley | |
| 3,233,395 A | 2/1966 | Dahl et al. | |
| 5,027,592 A | 7/1991 | Wieneke | |
| 8,757,524 B2* | 6/2014 | Mosman | A01G 3/00 241/30 |
| 9,161,566 B2* | 10/2015 | Hall | A01G 3/00 |

(Continued)

FOREIGN PATENT DOCUMENTS

| CA | 2775457 A1 | 11/2012 |
|---|---|---|
| CA | 3012787 A1 | 9/2017 |

(Continued)

OTHER PUBLICATIONS

"Spiral Blades Forming and Welding Machine", Ruigong Machinery Co., Ltd., as downloaded on Nov. 24, 2017 from http://www.tube-pipe-machines.com/product/spiral-blades-forming-welding-machine.html, (Aug. 7, 2016), 4 pgs.

(Continued)

*Primary Examiner* — Robert E Pezzuto
*Assistant Examiner* — Adam J Behrens
(74) *Attorney, Agent, or Firm* — Schwegman Lundberg & Woessner, P.A.

(57) ABSTRACT

An apparatus for trimming plant material includes a rotatable tumbler through which the plant material is to be axially propagated while rotationally tumbling, and a plurality of cutting reel systems adjacent the tumbler. The plurality of cutting reel systems includes a first cutting reel system adjacent the tumbler, and a second cutting reel system adjacent a landing zone of the rotatable tumbler. The landing zone is an angular range about the axis of the tumbler within which plant material tends to land on the tumbler after tumbling through a central volume of the tumbler.

24 Claims, 16 Drawing Sheets

(56) References Cited

U.S. PATENT DOCUMENTS

| | | | |
|---|---|---|---|
| 9,636,838 B2* | 5/2017 | Evans | A01G 3/002 |
| 10,415,740 B2* | 9/2019 | Evans | B26D 1/02 |
| 2002/0011134 A1 | 1/2002 | Rickheim | |
| 2005/0102843 A1 | 5/2005 | Jiang | |
| 2013/0175372 A1* | 7/2013 | Mosman | B02C 18/16 |
| | | | 241/25 |
| 2014/0087794 A1* | 3/2014 | Hall | A23N 15/06 |
| | | | 460/123 |
| 2014/0196587 A1* | 7/2014 | Beyerlein | B26D 1/40 |
| | | | 83/312 |
| 2015/0285427 A1* | 10/2015 | Evans | A01G 3/08 |
| | | | 83/859 |
| 2015/0290827 A1 | 10/2015 | Evans et al. | |
| 2017/0164557 A1* | 6/2017 | Harold | A01D 46/02 |
| 2018/0279564 A1 | 10/2018 | Mckellar et al. | |
| 2019/0070741 A1* | 3/2019 | Ingram | A01G 3/08 |
| 2019/0126284 A1 | 5/2019 | Mckellar et al. | |
| 2019/0224687 A1* | 7/2019 | Ingram | B02C 17/02 |

FOREIGN PATENT DOCUMENTS

| | | | |
|---|---|---|---|
| FR | 1116686 A | | 5/1956 |
| GB | 790483 A | | 2/1958 |
| GB | 2494206 A | | 3/2013 |
| JP | 2016-175117 A | | 10/2016 |
| WO | WO-2014183209 | | 11/2014 |
| WO | WO-2017161435 | | 9/2017 |
| WO | WO-2018009999 A1 | | 1/2018 |

OTHER PUBLICATIONS

"Spirals", Heusch GmbH, as downloaded on Nov. 24, 2017 from http://www.heusch.de/spirals, (Jan. 14, 2017), 5 pgs.

"Twister Systems", Keirton, Inc., as downloaded on Nov. 24, 2017 from https://www.twistertrimmer.com/twister-systems, (May 4, 2017), 7 pgs.

"U.S. Appl. No. 15/804,416, Non-Final Office Action dated Sep. 19, 2019", 14 pgs.

"High-CarbonSteels / Maine Welding Company", [Online] Retrieved from the internet: <URL: <http://mewelding.com/high-carbon-steels/archive.org>, (Feb. 20, 2016), 2 pgs.

"Machine Translation (Description and Claims of JP 2016-175117A", [Online]. Retrieved from the Internet: <URL: Espacnet. com>, (2016), 10 pgs.

"Mig Spot-Welding", [Online]. Retrieved from the Internet: <URL: https://www.esabna.com/euweb/mig_handbook/592mig11_1. html>, (Oct. 12, 2016), 1 pg.

"Salt Bath Nitriding/Ferritic Nitrocarburizing—DHN/DHFNC", IBC Coating Technologies Inc. [Online]. Retrieved from the Internet: <URL: http://www.ibccoatings.com/salt-bath-nitriding-ferritic-nitrocarburizing-dhn-dhfnc,/archive.org>, (Jun. 28, 2015), 2 pgs.

Dr. Smith, Scott, "Balancing Rotating Elements in Machines", [Online]. Retrieved from the Internet: <URL: https://www.ctemag.com/news/articles/balancing-rotating-elements-machines>, (Apr. 1, 2014), 6 pgs.

PRAXAIR, "TIG Welding", [Online]. Retrieved from the Internet: <URL: https://www.praxairdirect.com/Industrial-Gas-and-Welding-lnformation-Center/Welding-Tips-Tricks-and-Information/TIG-Welding.html>, (Jul. 31, 2013), 3 pgs.

"International Application No. PCT/CA2018/000200, International Search Report and Written Opinion dated Jan. 15, 2019", (Jan. 15, 2019), 7 pgs.

"International Application No. PCT/CA2018/000201, International Search Report and Written Opinion dated Jan. 17, 2019", (Jan. 17, 2019), 9 pgs.

U.S. Appl. No. 15/804,416, filed Nov. 6, 2017, Helical-Bladed Cutting Reel.

"Australian Application Serial No. 2018355904, Examination Report dated May 29, 2020", 8 pgs.

"U.S. Appl. No. 15/804,416, Response filed Jan. 21, 2020 to Non Final Office Action dated Sep. 19, 2019", 13 pgs.

"U.S. Appl. No. 15/804,416, Final Office Action dated Mar. 2, 2020", 14 pgs.

* cited by examiner

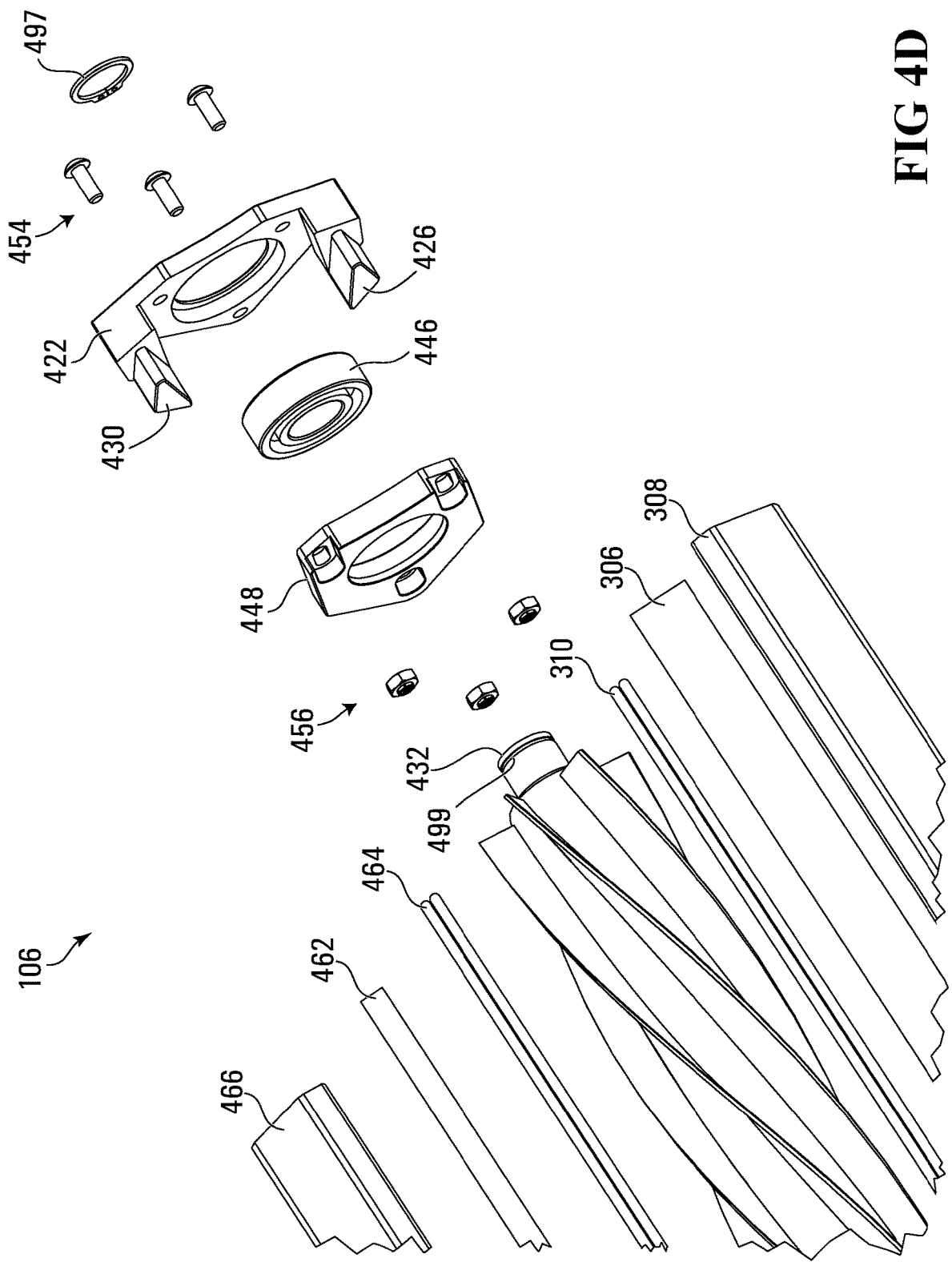

PLANT TRIMMING APPARATUS AND METHODS

FIELD OF THE INVENTION

The present invention relates to apparatus and methods for trimming plant material.

BACKGROUND OF THE INVENTION

Some types of plant crops are harvested primarily for their flowers or for their pre-flowering buds (embryonic shoots). Examples of such crops include hops (one of the four main ingredients in beer), medical marijuana, or recreational marijuana in jurisdictions where it is legal, for example.

The harvesting of such crops typically includes separating the desirable flowers or buds from undesirable leaf material. Conventionally, this is achieved by causing harvested buds to propagate axially through the inside of a tumbler, which is typically a rotating cylinder formed of sheet metal with slots cut out of it. The axial propagation of the plant material through the tumbler is often gravity-driven, by inclining the axis of the tumbler relative to a horizontal plane, although other ways of axially driving the material are also known. Rotation of the tumbler causes the buds to rotate and tumble while they simultaneously propagate axially through the length of the tumbler. As the tumbler rotates, a vacuum underneath the tumbler applies a suction force, which causes some of the leaves to protrude downward through the slots of the tumbler and into the path of a cutting reel system adjacent the tumbler. The cutting reel system conventionally includes a rotating cutting reel and a rigid planar cutting knife interposed between the reel and the tumbler. The knife is typically a rigid rectangular piece of hard metal with at least one cutting edge. The cutting reel typically includes a cylindrical central shaft that supports multiple helical cutting blades that wind at least partly around the central shaft as they extend across the length of the reel. The vacuum beneath the tumbler tends to pull leaf material downward through the slots in the tumbler, where the leaf material is then cut by the scissor-like action of each helical cutting blade bearing against the cutting edge of the cutting knife as the reel rotates.

Throughput rates of such conventional trimming systems are inherently limited. The axial throughput rate cannot be arbitrarily increased because it is limited by the rate at which the cutting reel system can remove the undesired leaf material: if the axial throughput rate is increased too high, the buds will not complete a large enough number of rotations past the cutting reel system to remove enough leaf material to produce a bud that has been trimmed to commercially acceptable, vendible standards. The rotational rate of the tumbler cannot be arbitrarily increased to compensate for a larger axial throughput rate, because the tumbler rotation rate is limited by centrifugal force: if the tumbler rotates too quickly then outward centrifugal force will prevent the buds from tumbling and will instead cause the buds to adhere to the inside surface of the tumbler throughout its entire rotation, so that only the outward facing sides of the outermost buds will be trimmed, leaving all of the other plant material entirely untrimmed.

One prior attempt to address this problem involved aggregating two tumblers and two cutting reels in a single trimming machine, with each tumbler having its own respective single cutting reel.

SUMMARY OF THE INVENTION

In one illustrative embodiment of the present invention, an apparatus for trimming plant material includes a rotatable tumbler through which the plant material is to be axially propagated while rotationally tumbling, and a plurality of cutting reel systems adjacent the tumbler. The plurality of cutting reel systems includes a first cutting reel system adjacent the tumbler and a second cutting reel system adjacent a landing zone of the tumbler. The landing zone is an angular range about the axis of the tumbler within which plant material tends to land on the tumbler after tumbling through a central volume of the tumbler.

Advantageously, such a combination represents not only quantitative but also qualitative improvements over conventional trimming machines, because the plurality of cutting reel systems co-operate to achieve a new synergistic effect, as discussed below. In particular, the cutting reel systems co-operate in a manner that allows the second cutting reel system to achieve a deeper leaf cut of each bud that passes it than conventional cutting reels, while the first cutting reel system tends to provide complementary finer cuts. These qualitative improvements translate into quantitative improvements: for example, the present inventors have found that such an embodiment can achieve throughput rates appreciably greater than the mere doubling that one might intuitively expect from doubling the number of cutting reels per tumbler.

In this regard, by way of contrast, the present inventors have studied the motion of leafy plant material in conventional tumblers. In a conventional trimming machine, as the buds pass over the cutting reel system mounted beneath the tumbler, the tumbling action of the buds rolling over each other tends to flatten their leaves, so that only a small end portion of each leaf protrudes radially outward through the tumbler so as to be trimmed by the cutting reel below. This tends to limit the size of the leaf portion that can be cut with each rotation past the cutting reel, thereby requiring more rotations of the tumbler in order to adequately trim the leaves. As noted above, the rotational rate of the tumbler cannot be arbitrarily increased to compensate for a small cutting rate per rotation, because the rotational rate is limited by centrifugal force. Therefore, since the rotational frequency cannot be significantly increased, the only other way to conventionally achieve the required number of rotations of the tumbler is to provide a relatively slow axial throughput rate, so that each bud undergoes a relatively large number of rotations as it propagates through the axial length of the tumbler. After each bud rotates past a conventional cutting reel, it travels upward along the inside surface of the upward-rotating side of the tumbler until it rises above the horizontal plane in which the axis of the tumbler lies, at which point gravity begins to exert a radially inward force on the bud, causing the bud to tumble inward and toward the central volume of the tumbler, with some of the buds crossing through the central volume to land on the opposite, downward-rotating side of the tumbler. The present inventors have discovered that as a bud departs the upward-rotating side of the tumbler's inner surface and launches freely through the air to travel through the central volume and toward the downward-rotating side of the tumbler, its leaves tend to significantly extend or spread out. Unfortunately, once the bud lands on the downward-rotating side of the conventional tumbler, its leaves are once again flattened by collisions and rolling interactions with other buds before the bud in question passes over the cutting reel again, thereby continuing to limit the size of the leaf portion that can be removed with each pass by the conventional cutting reel.

Advantageously, therefore, in the illustrative embodiment of the invention described above, by providing the second cutting reel system adjacent the landing zone of the tumbler, in which plant material tends to land on the tumbler after being tumbled through the central volume of the tumbler, the buds are still in a state with their leaves mostly extended or spread out when they pass by the second cutting reel system, because the buds do not have enough time between landing and passing the second cutting reel system to collide with and roll over other buds to cause their leaves to fully flatten again. Consequently, each time a bud passes over the second cutting reel system, a longer, deeper portion of its leaf material tends to protrude through the tumbler to be cut by the second reel system, compared to the shorter cuts that tend to result from a conventional tumbler equipped with only a single cutting reel directly below the tumbler. Thus, fewer rotations of the tumbler are required to sufficiently trim away the leaf material from the buds, thereby permitting a faster axial throughput rate than with conventional trimming machines. Moreover, as a further synergistic effect, the first and second cutting reel systems co-operate so that the second cutting reel system adjacent the landing zone of the tumbler tends to provide deeper, coarser cuts, while the first cutting reel provides comparatively shallower, finer cuts, so that the improved throughput rate does not require any sacrifice in trimming quality as a trade-off.

In illustrative embodiments, the landing zone angular range may include an angular range from $1 \times 10^1$ to $9 \times 10^1$ degrees measured in a direction of rotation that is opposite to a direction of rotation of the tumbler from a vertically lowest angular position of the tumbler. For example, in one such embodiment the landing zone may include an angular range from $2 \times 10^1$ to $8 \times 10^1$ degrees measured in the direction opposite to the direction of rotation of the tumbler from the vertically lowest angular position of the tumbler. In another such embodiment the landing zone includes a similarly measured angular range from $3 \times 10^1$ to $7 \times 10^1$ degrees. In another such embodiment the landing zone includes a similarly measured angular range from $4 \times 10^1$ to $6 \times 10^1$ degrees.

The second cutting reel system may be disposed at an angular position within a range from $1 \times 10^1$ to $9 \times 10^1$ degrees about the axis of the tumbler, measured in the direction opposite to the direction of rotation of the tumbler from the vertically lowest angular position of the tumbler. For example, in one such embodiment the second cutting reel system is disposed at an angular position within a similarly measured angular range from $2 \times 10^1$ to $8 \times 10^1$ degrees. In another such embodiment the second cutting reel system is disposed at an angular position within a similarly measured angular range from $3 \times 10^1$ to $7 \times 10^1$ degrees. In another such embodiment the second cutting reel system is disposed at an angular position within a similarly measured angular range from $4 \times 10^1$ to $6 \times 10^1$ degrees. For example, the second cutting reel system may be disposed at an angular position of $5 \times 10^1$ degrees about the axis of the tumbler, measured in the direction opposite to the direction of rotation of the tumbler from the vertically lowest angular position of the tumbler.

Each of the plurality of cutting reel systems may include a rotatable cutting reel having a plurality of helical cutting blades, and a flexible cutting knife having a cutting edge interposed between the cutting reel and the tumbler such that plant material protruding radially outward through the tumbler is trimmed by scissor action of the helical cutting blades bearing against the cutting edge of the flexible cutting knife as they rotate.

Advantageously, the use of a flexible cutting knife facilitates the use of smaller cutting reels than those employed in conventional plant trimming machines, thereby facilitating the employment of multiple reels adjacent a single tumbler, by allowing smaller spacing between the reels and tumbler. Moreover, the use of a flexible cutting knife also avoids the need for adjustability of the spacing between the tumbler and reels, in contrast with conventional systems that typically require additional mechanisms to provide such adjustability.

The apparatus may further include an anti-dive mechanism to prevent the flexible cutting knife from blocking rotation of the helical cutting blades.

For example, the anti-dive mechanism may include a support ring adjacent a leading end of the flexible cutting knife at which each of the helical blades first contacts the flexible cutting knife, the support ring being configured to maintain a fixed spacing between the leading end of the flexible cutting knife and an axis of the cutting reel. As a further example, the anti-dive mechanism may include a protrusion of the flexible cutting knife at a leading end of the flexible cutting knife at which each of the helical blades first contacts the flexible cutting knife, the protrusion extending past a cutting edge of the flexible cutting knife in a direction generally opposite to a tangential direction of rotation of the helical blades as they bear against the flexible cutting knife. As yet another example, the anti-dive mechanism may include a bent leading corner of the flexible cutting knife at a leading end of the flexible cutting knife at which each of the helical blades first contacts the flexible cutting knife, the bent leading corner being bent out of a plane of the flexible cutting knife in a direction away from the cutting reel. Advantageously, such anti-dive mechanisms improve the reliability of operation using flexible cutting knives, thereby allowing the above-noted advantages of flexible cutting knives to be achieved without sacrificing reliability.

The first cutting reel system may be adjacent a rising zone of the tumbler, the rising zone being an angular range about the axis of the tumbler within which the plant material tends to maintain contact with the tumbler while rotating and vertically rising before being tumbled toward the landing zone.

The rising zone may include an angular range extending for $1.4 \times 10^2$ degrees in a direction of rotation of the tumbler from a vertically lowest angular position of the tumbler. Alternatively, the rising zone may include larger or smaller angular ranges, depending upon the operational parameters of a particular embodiment, such as tumbler rotation speed and physical properties of the plant material 114.

The first cutting reel system may be disposed at an angular position within a range from $0 \times 10^1$ to $1.4 \times 10^2$ degrees about the axis of the tumbler, measured in the direction of rotation of the tumbler from the vertically lowest angular position of the tumbler. For example, in one such embodiment the first cutting reel system may be disposed at an angular position within a similarly measured angular range from $1 \times 10^1$ to $9 \times 10^1$ degrees. In another such embodiment the first cutting reel system may be disposed at an angular position within a similarly measured angular range from $2 \times 10^1$ to $8 \times 10^1$ degrees. In another such embodiment the first cutting reel system may be disposed at an angular position within a similarly measured angular range from $3 \times 10^1$ to $7 \times 10^1$ degrees. In another such embodiment the first cutting reel system may be disposed at an angular position within a similarly measured angular range from $4 \times 10^1$ to $6 \times 10^1$ degrees. For example, the first cutting reel system may be disposed at a similarly measured angular position of $5 \times 10^1$ degrees about the axis of the tumbler, measured in the direction of rotation of the tumbler from the vertically lowest angular position of the tumbler.

In some embodiments, the plurality of cutting reel systems may further include at least a third cutting reel system adjacent the tumbler. In such embodiments, the first cutting reel system may be adjacent the rising zone of the tumbler as described above, and the third cutting reel system may be adjacent the tumbler between the first cutting reel system and the second cutting reel system.

In some embodiments, the plurality of cutting reel systems may consist of the first, second and third cutting reel systems. Alternatively, in other embodiments the plurality of cutting reel systems may consist of only the first and second cutting reel systems.

Each of the plurality of cutting reel systems may include a cutting reel configured to rotate in a direction opposite to a rotational direction of the tumbler.

Each of the helical blades of the cutting reel may extend more than one-half rotation around the cutting reel over its axial length. For example, in some embodiments each of the helical blades may extend at least one and one-half rotations around the cutting reel over its axial length. Advantageously, such embodiments tend to provide improved shearing action compared to conventional plant trimming machines, which typically have lower helicity blades, which may only extend for a fifth or a quarter of one rotation around the reel over its length. For example, a reel with six blades each having 1.5 rotations around the reel effectively achieves nine points of contact at any given time, ensuring that some of the blades are always in contact with the knife, in contrast with conventional systems that typically involve intermittent contact.

Each of the plurality of cutting reel systems may be gear-driven. Advantageously, therefore, removal of the cutting reel systems for cleaning is facilitated in such gear-driven embodiments, by avoiding the need that arises in conventional belt-driven systems to loosen a drive belt to remove a cutting reel system for cleaning, then precisely re-tighten the belt after re-installing the cutting reel system.

Moreover, the apparatus may further include a housing having receptacles configured to removably receive the plurality of cutting reel systems therein, and the housing may include a closeable lid having retention structures configured to operably secure the plurality of cutting reel systems in the receptacles when the lid is closed. Advantageously, therefore, in such embodiments removing the reels and knives for cleaning or sharpening is a trivially easy process of simply opening the lid and lifting the reel and knife assemblies out of the housing, in contrast with the more laborious removal processes of conventional systems.

In another illustrative embodiment, a method of trimming plant material includes rotating a tumbler through which the plant material is being axially propagated while rotationally tumbling, and operating a plurality of cutting reel systems adjacent the tumbler. Operating includes operating a first cutting reel system adjacent the tumbler, and operating a second cutting reel system adjacent a landing zone of the tumbler, the landing zone being an angular range about an axis of the tumbler within which plant material tends to land on the tumbler after tumbling through a central volume of the tumbler.

In another illustrative embodiment, an apparatus for trimming plant material includes a housing having at least one receptacle configured to removably receive at least one cutting reel system to rest unsecured therein, wherein the housing comprises a closeable lid having retention structure configured to operably secure the at least one cutting reel system in the at least one receptacle when the lid is closed.

Other aspects, features and advantages of illustrative embodiments of the present invention will become apparent to those ordinarily skilled in the art upon review of the following description of such embodiments in conjunction with the accompanying figures.

BRIEF DESCRIPTION OF THE DRAWINGS

In drawings which illustrate embodiments of the invention,

FIG. 4D is a detail exploded view of a right end portion of the first cutting reel system of FIG. 3;

DETAILED DESCRIPTION

Figure 1A:
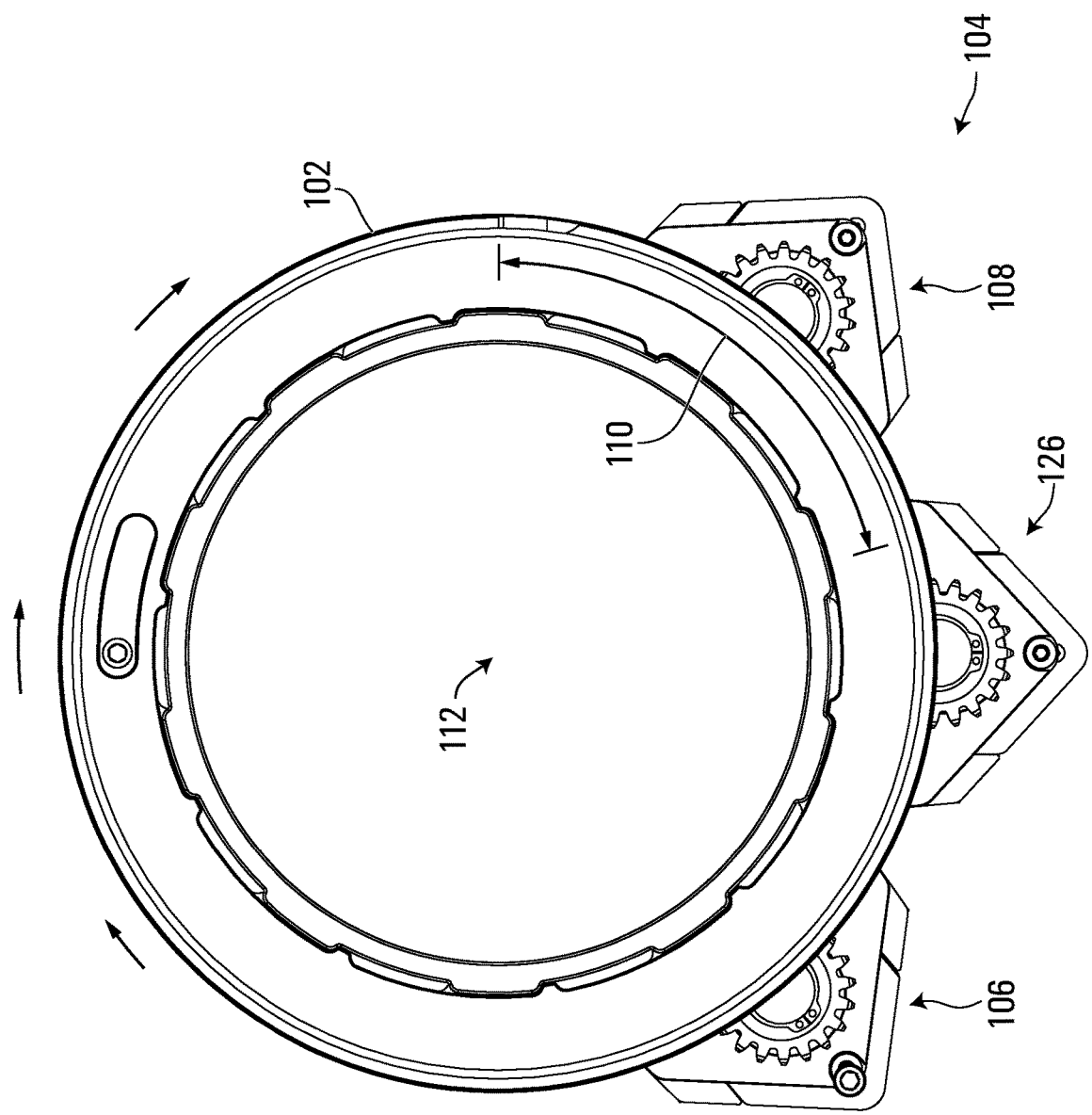
FIG. 1A is a left elevation view of a plurality of cutting reel systems adjacent a rotatable tumbler of an apparatus for trimming plant material according to a first embodiment of the invention.
Figure 1B:
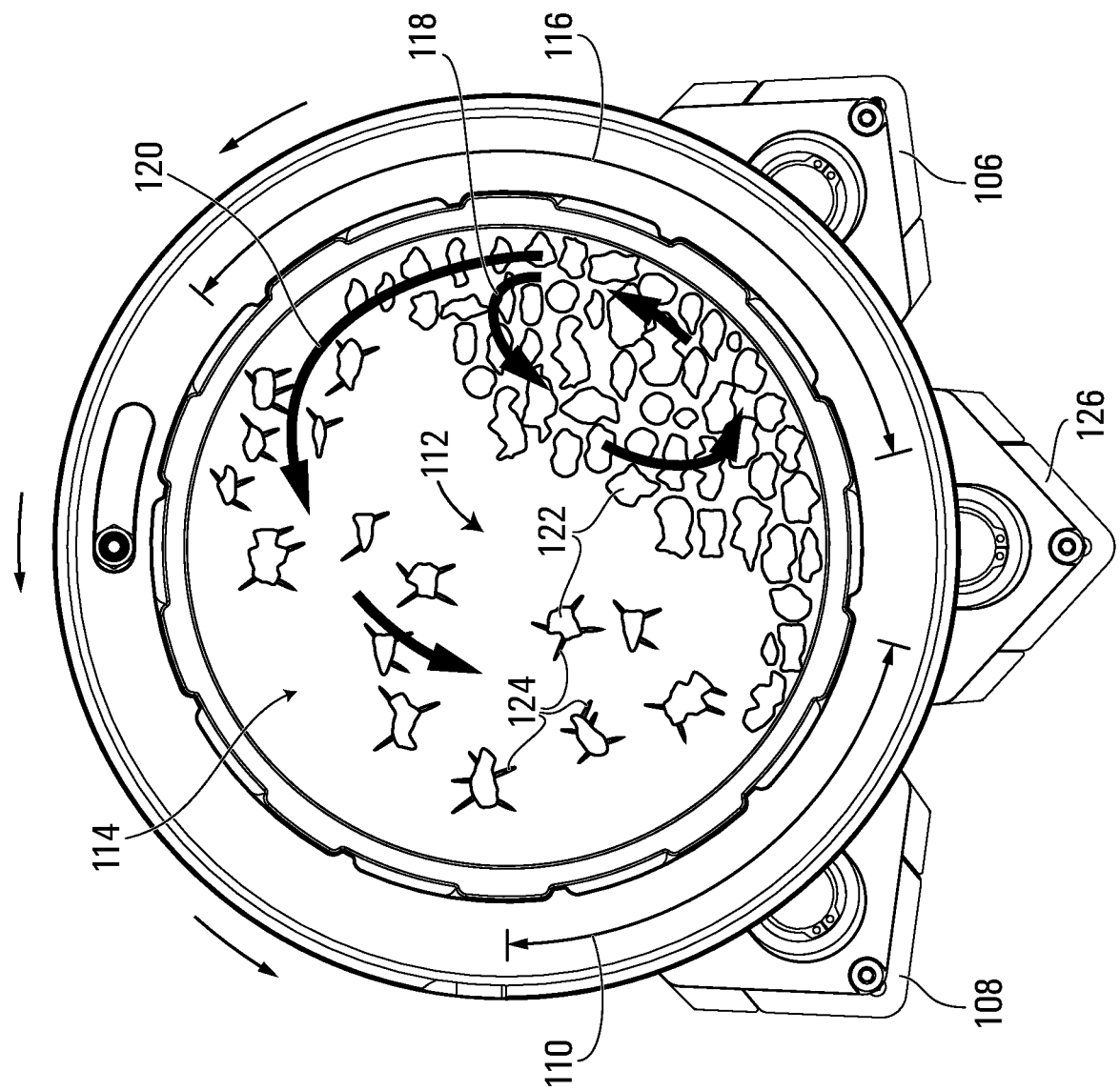
FIG. 1B is a right elevation view of the plurality of cutting reel systems adjacent the rotatable tumbler of FIG. 1A, shown with plant material rising through a rising zone of the tumbler and landing in a landing zone of the tumbler as the tumbler rotates.
Figure 1C:
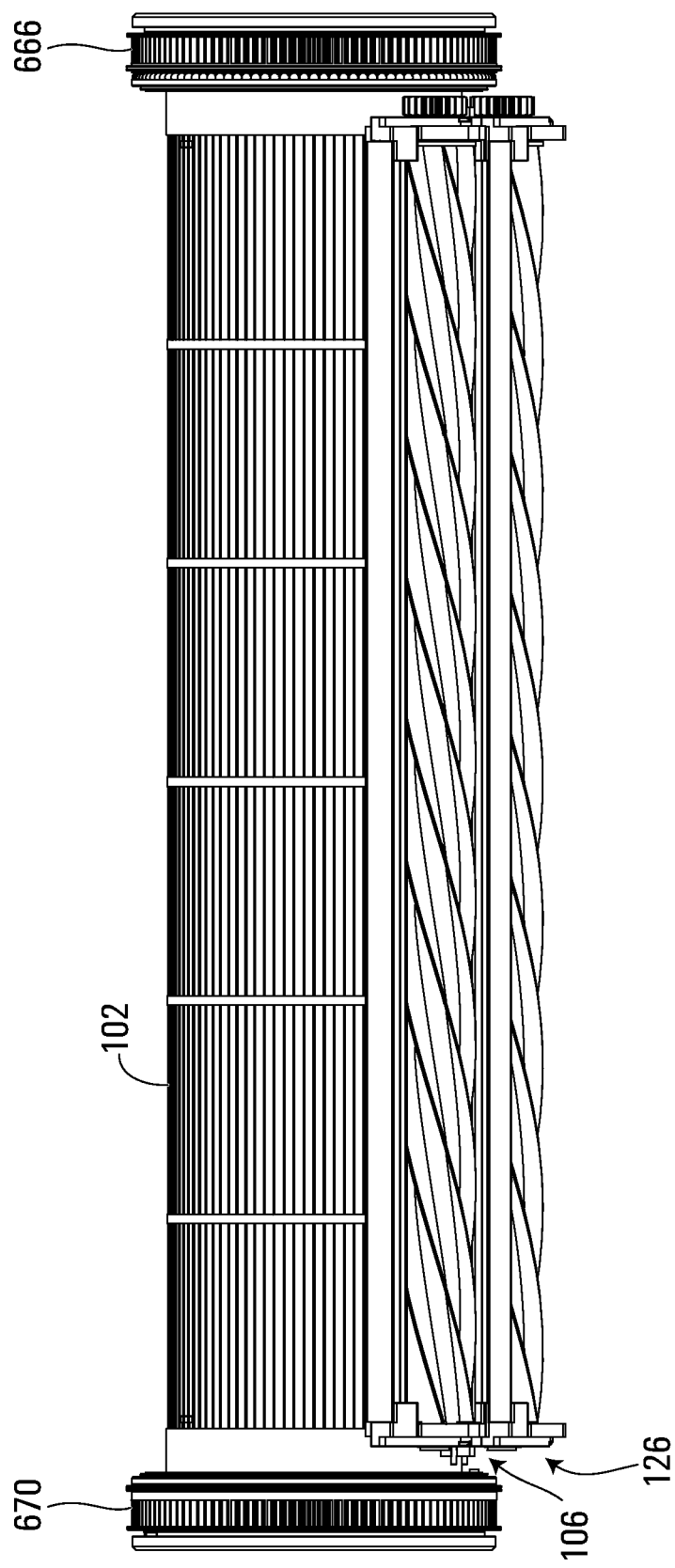
FIG. 1C is a rear elevation view of the plurality of cutting reel systems adjacent the rotatable tumbler of FIG. 1A.
Figure 1D:
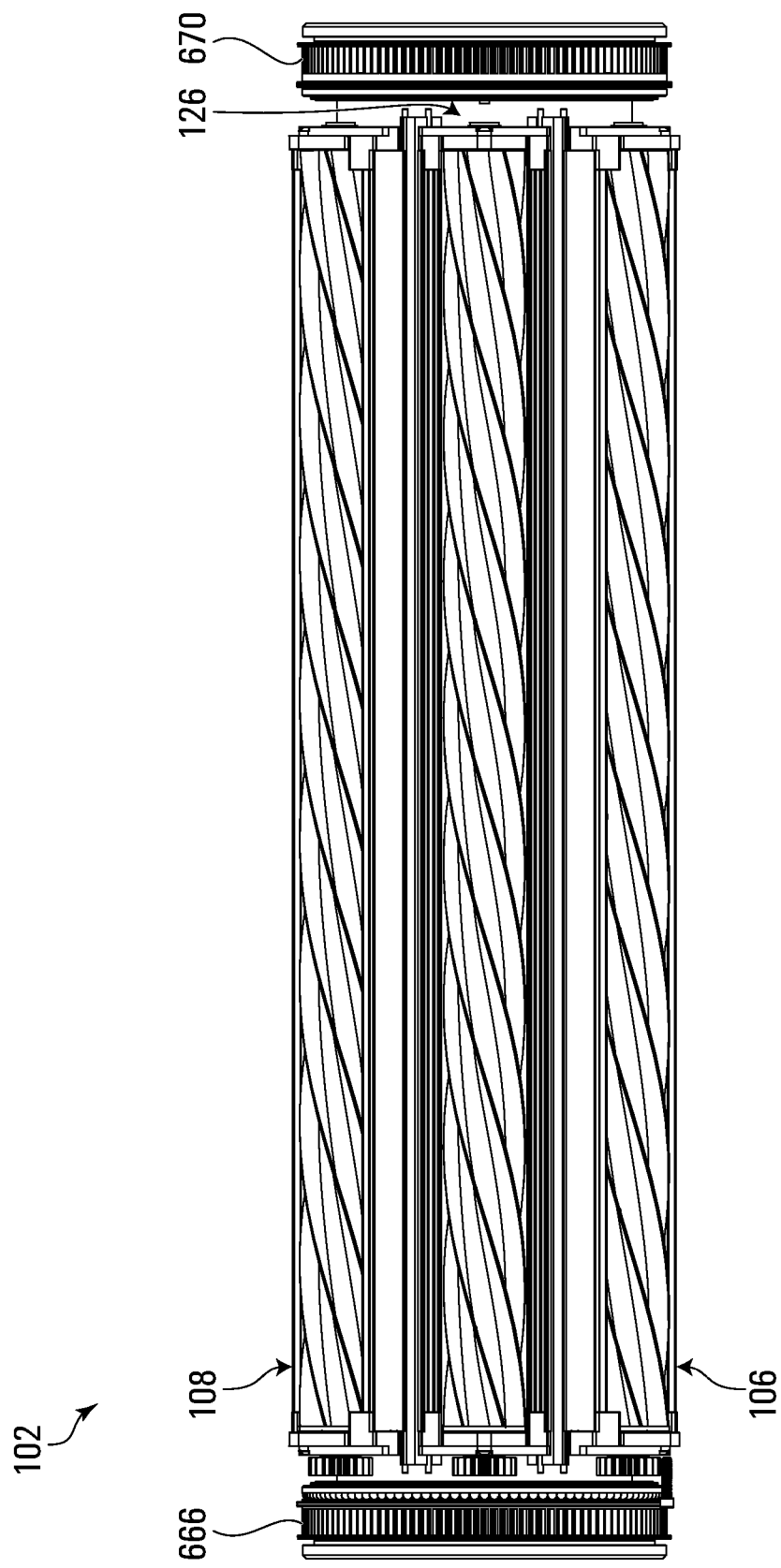
FIG. 1D is a bottom elevation view of the plurality of cutting reel systems adjacent the rotatable tumbler of FIG. 1A.
Figure 2:
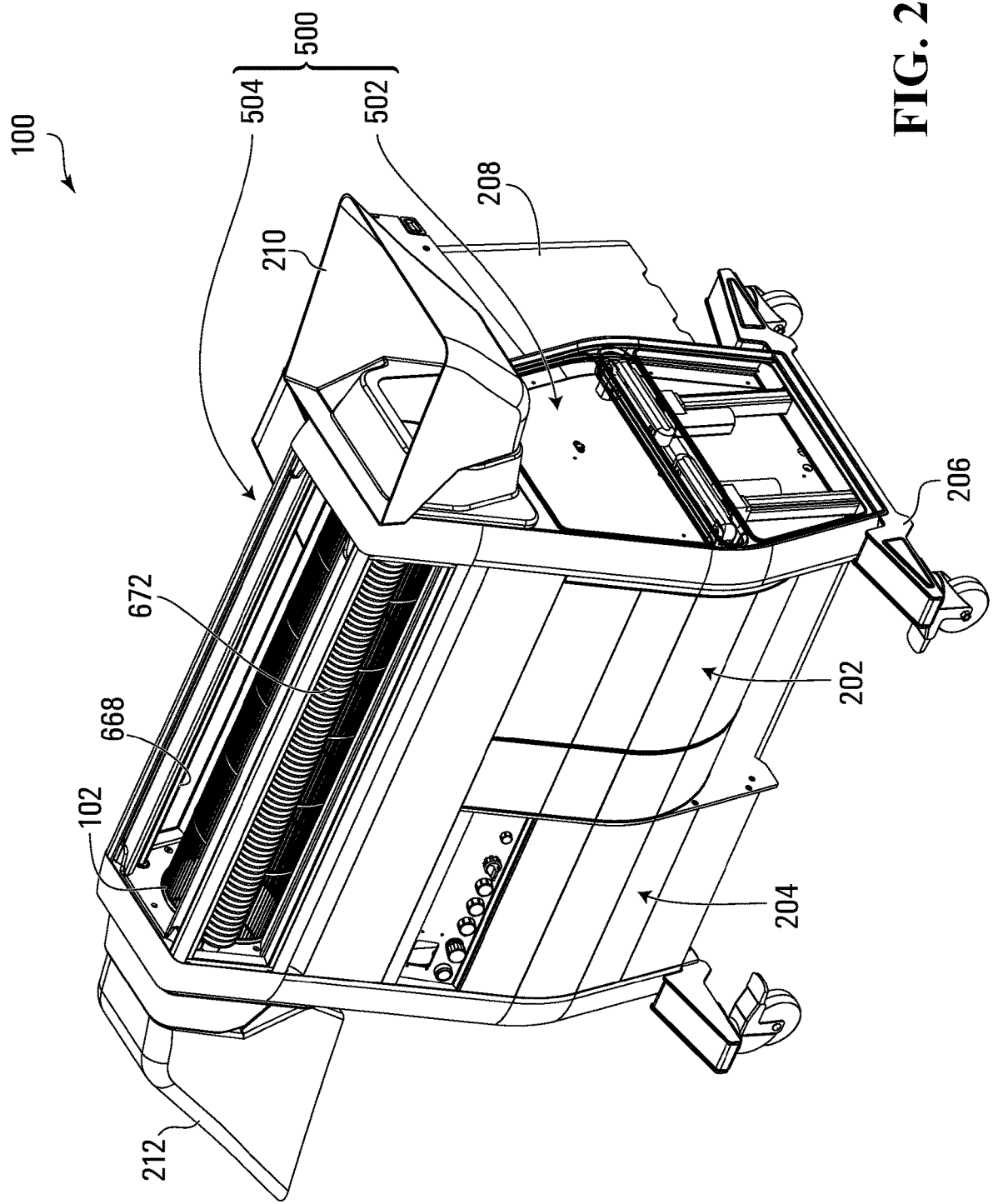
FIG. 2 is a right-front isometric view of an apparatus for trimming plant material including the plurality of cutting reel systems and the rotatable tumbler of FIGS. 1A-1D, shown with a lid and tumbler assembly in a closed position and equipped with plant material inlet and exhaust chutes.

Referring to FIGS. 1A-1D and 2, an apparatus for trimming plant material according to a first embodiment is shown generally at 100 in FIG. 2. As shown in FIGS. 1A-1D, in this embodiment the apparatus 100 includes a rotatable tumbler 102 through which the plant material is to be axially propagated while rotationally tumbling, and a plurality of cutting reel systems 104 adjacent the tumbler 102. More particularly, in this embodiment the plurality of cutting reel systems 104 includes a first cutting reel system 106 adjacent the tumbler 102, and a second cutting reel system 108 adjacent a landing zone 110 of the tumbler. The landing zone is an angular range about an axis of the tumbler 102 within which plant material tends to land on the tumbler 102 after tumbling through a central volume 112 of the tumbler 102.

Landing Zone, Rising Zone And Associated Cutting Reel Systems

FIG. 1B shows the tumbler 102 as it appears in operation with plant material shown generally at 114 tumbling within the tumbler 102 as it rotates. The direction of rotation of the tumbler 102 is counter-clockwise as shown in the right elevation view of FIG. 1B (clockwise in the left side views of FIGS. 1A and 2).

Through detailed study of typical tumbling motion of the plant material 114, the present inventors have discerned that in a typical tumbling operation, the plant material 114 tends to effectively involve two different tumbling zones, associated with the landing zone 110 of the tumbler 102 and with a rising zone 116 of the tumbler shown in FIG. 1B, respectively.

In this embodiment, the first cutting reel system 106 is adjacent the rising zone 116 of the tumbler 102. The rising zone 116 is an angular range about the axis of the tumbler 102 within which the plant material 114 tends to maintain contact with the tumbler 102 while rotating and vertically rising before being tumbled toward the landing zone 110.

However, not all of the plant material 114 that rises up through the rising zone 116 as the tumbler 102 rotates is tumbled toward the landing zone 110. Rather, as the plant material 114 rises up through the rising zone 116, initially maintaining contact with the tumbler 102, the plant material 114 tends to bifurcate into two distinct plant material streams, depicted as a first tumbling stream 118 and a second tumbling stream 120 of tumbling plant material.

In this embodiment, the plant material 114 comprises leafy buds 122 having leaves 124 that are desired to be trimmed. Through careful study of such plant material 114 as it tumbles within the tumbler 102, the present inventors have found that within the churning mass of plant material in the rising zone 116, the leaves 124 of each of the buds 122 tend to be flattened by collisions and rolling contact with other buds, which tends to reduce the extent to which the leaves 124 are able to protrude outward through the tumbler 102 to be trimmed by a cutting reel system. The present inventors have further found that as plant material 114 breaks contact with the tumbler 102 to form the second tumbling stream 120, the leaves 124 of each bud 122 tend to open up or spread out again because the buds 122 are not in tight rolling contact with each other as they tumble back downward within the second tumbling stream 120. The buds 122 of the second tumbling stream 120 tend to strike the tumbler at high velocity, with their leaves spread out, both of which facilitate deep trimming, whereas the buds 122 of the first tumbling stream 118 tend to strike each other in a crowded low velocity swirling mass in which the leaves of individual buds are generally flattened by frequent collisions with other buds. The underlying physical causes are discussed below.

The first tumbling stream 118 tends to break contact with the tumbler 102 at a lower vertical height, after having travelled a smaller angular range around the tumbler 102, than the second tumbling stream 120. The different heights of the points of departure of the first and second tumbling streams result in a number of significant physical consequences. First, because the plant material adjacent the tumbler surface is travelling on an arcuate (circular) path, if it breaks contact with the tumbler after having rotated only slightly more than 90 degrees from the vertically lowest point of the tumbler (as it does for the first tumbling stream 118), its instantaneous tangential velocity at the time of departure will be almost entirely vertical, with only a small horizontal component. For this reason, the first tumbling stream 118 does not tend to tumble as far horizontally rearward as a vertical plane that includes the central axis of the tumbler. In contrast, the plant material 114 of the second tumbling stream 120 adheres to the tumbler over wider angular ranges through the rising zone 116 before breaking contact with the tumbler, with individual buds having a range of increasingly higher horizontal rearward velocity components resulting from increasing angular travel through the rising zone 116 before breaking contact with the tumbler. As a result, as the plant material 114 of the second tumbling stream 120 breaks contact with the rising zone 116 of the tumbler 102, its individual buds will have a range of horizontal rearward velocity components that are all higher than those of the buds in the first tumbling stream 118. The higher departure height at which the buds in the second tumbling stream break contact with the tumbler also means that the plant material of the second tumbling stream spends more time travelling at this higher rearward horizontal velocity as it tumbles downward. The second tumbling stream 120 therefore tends to travel further horizontally rearward, and to spread out over a wider angular range as it tumbles downward, becoming less horizontally crowded as it falls than the plant material of the first tumbling stream 118. This decreased crowding tends to increase the mean-free path of individual buds 122 within the second tumbling stream 120, meaning the average travel distance before collision with another bud, so that individual buds 122 of the second tumbling stream 120 are less likely to collide with one another as they tumble downward through the central volume of the tumbler than the buds of the first tumbling stream 118. In addition, due to a combination of their higher departure height from the tumbler wall and their greater angular spread as they fall, individual buds 122 of the second tumbling stream 120 tend to spend longer free-falling under the influence of gravity without colliding with other buds than their first tumbling stream counterparts. This longer average free-falling time causes the buds 122 of the second tumbling stream 120 to spread out vertically to a greater extent than their first tumbling stream counterparts, which in turn further reduces crowding and further increases the mean-free path within the second tumbling stream 120 compared to that in the first tumbling stream 118.

As a result of the above physical consequences, the first tumbling stream 118 breaks contact with the tumbler and tumbles back downward, its plant material 114 does not tend to land on the tumbler 102 itself, but rather, tends to land on other plant material 114 that is already in contact with the tumbler 102 as it rotates (some of which has been placed in contact with the tumbler 102 by the second tumbling stream 120 as discussed below). Thus, within the rising zone 116, the plant material 114 tends to form a continuously churning, crowded mass of circulating plant material in which individual buds continuously tumble onto and roll over themselves, which causes their leaves to remain relatively flattened and difficult to trim.

In contrast, the second tumbling stream 120 tends to break contact with the tumbler 102 over a range of higher vertical heights than the first tumbling stream 118, and travels further horizontally rearward through the interior volume of the tumbler. The second tumbling stream 120 tends to pass through a central volume of the tumbler 102 around the central axis of the tumbler. More particularly, the second tumbling stream 120 tends to pass through a vertical plane that includes the central axis of the tumbler before landing on the tumbler 102. Unlike the first tumbling stream 118, the plant material of the second tumbling stream 120 does in fact tend to land on the tumbler 102 itself, landing directly on the inside surface of the tumbler 102 after tumbling through the central volume 112 of the tumbler, rather than landing on other plant material 114. Moreover, since the individual buds 122 of the second tumbling stream 120 have a higher average free-falling time due to their longer mean-free path and their higher departure height from the tumbler, the individual buds 122 of the second tumbling stream 120 tend to reach significantly higher downward velocities than their counterparts in the first tumbling stream. This results in high impact velocities of individual buds 122 in the second tumbling stream 120 as they impact upon the tumbler.

Moreover, not only do the buds 122 of the second tumbling stream 120 reach higher downward velocities while tumbling, their leaves also tend to spread out as they fall, due to the decreased crowding effects and longer mean-free path as described above. Also, unlike the first tumbling stream 118, the buds 122 of the second tumbling stream 120 tend to land on the tumbler 102 itself, on its inside surface, rather than landing on other plant material 114. Accordingly, the buds 122 of the second tumbling stream 120 tend to land on the tumbler 102 with their leaves 124 spread out and with relatively high impact velocities, causing the leaves 124 to protrude more deeply through the apertures in the tumbler 102 for potential trimming than the flattened leaves of the buds churning in the rising zone 116.

Consequently, in this embodiment the present inventors have unconventionally placed the second cutting reel system 108 in the landing zone 110, in contrast to conventional systems that typically use only a single cutting reel system disposed vertically beneath the central axis of the tumbler. Due to its advantageous placement in the landing zone 110, and its ability to trim leaves that protrude outward through the tumbler in a spread out or extended state rather than in a flattened state, the second cutting reel system 108 is capable of achieving deeper leaf cuts than conventional cutting reel systems.

In this embodiment, the landing zone angular range includes an angular range from $1 \times 10^1$ to $9 \times 10^1$ degrees (10 to 90 degrees, expressed with one significant digit in scientific notation), measured in a direction of rotation that is opposite to a direction of rotation of the tumbler 102, from a vertically lowest angular position of the tumbler 102. More generally, it will be appreciated that the precise angular extent of the landing zone 110 may vary with the parameters of the particular trimming apparatus; the landing zone angular range of the present embodiment reflects a typical tumbler rotation speed, which is typically selected to be as fast as possible while allowing tumbling, i.e. falling short of a rotational speed at which centrifugal force would cause the plant material to adhere to the tumbler 102 throughout the entirety of each 360-degree rotation without breaking contact with the tumbler and tumbling as described above. In other embodiments, for example, the landing zone 110 may range from $2 \times 10^1$ to $8 \times 10^1$ degrees opposite the rotation of the tumbler from its lowest point, while the landing zones of other embodiments may range from $3 \times 10^1$ to $7 \times 10^1$ degrees, or from $4 \times 10^1$ to $6 \times 10^1$ degrees, for example.

In the present embodiment, the second cutting reel system 108 is adjacent the landing zone 110 and is therefore disposed at an angular position within a range from $1 \times 10^1$ to $9 \times 10^1$ degrees about the axis of the tumbler 102, measured in the direction opposite to the direction of rotation of the tumbler from the vertically lowest angular position of the tumbler. More particularly, in this embodiment the range is from $2 \times 10^1$ to $8 \times 10^1$ degrees. More particularly still, in this embodiment the range is from $3 \times 10^1$ to $7 \times 10^1$ degrees. More particularly still, in this embodiment the range is from $4 \times 10^1$ to $6 \times 10^1$ degrees. More particularly still, in this embodiment the angular position of the second cutting reel system 108 is $5 \times 10^1$ degrees about the axis of the tumbler 102, measured in the direction opposite to the direction of rotation of the tumbler from the vertically lowest angular position of the tumbler. The present inventors have found that for a typical tumbling rotation speed, such a placement of the second cutting reel system 108 adjacent the landing zone 110 tends to provide the second cutting reel system 108 with the ability to achieve deeper leaf cuts of the leaves 124 of the buds 122 of the second tumbling stream 120.

As noted above, the second cutting reel system 108 disposed in the landing zone 110 is complemented by the effects of the first cutting reel system 106, which is disposed in the rising zone 116. Due to the above-noted leaf-flattening effect that predominates within the churning mass of plant material 114 in the rising zone 116, the leaves 124 do not tend to protrude as deeply through the rising zone 116 of the tumbler 102 for trimming as they do through the landing zone 110. Consequently, in contrast to the deeper, coarser cuts that tend to be achieved by the second cutting reel system 108, the first cutting reel system 106 tends to provide finer cuts, of only the tips of any leaves 124 or of any remaining leaf portions thereof.

In this embodiment, the rising zone angular range extends for about $1.4 \times 10^2$ degrees about the axis of the tumbler 102, in a direction of rotation of the tumbler from a vertically lowest angular position of the tumbler. Alternatively, the rising zone may include larger or smaller angular ranges, depending upon the operational parameters of a particular embodiment, such as tumbler rotation speed and physical properties of the plant material 114.

In the present embodiment, the first cutting reel system 106 is adjacent the rising zone 116 and is therefore disposed at an angular position within a range from $0 \times 10^1$ to $1.4 \times 10^2$ degrees about the axis of the tumbler, measured in the direction of rotation of the tumbler from the vertically lowest angular position of the tumbler. However, a cutting reel placement at an angular position greater than ninety degrees will tend to trim the plant material less efficiently than angular position of ninety degrees or less, because too much of the plant material will break contact with the tumbler before reaching a cutting reel placed at an angular position of more than ninety degrees within the rising zone 116. Consequently, in the present embodiment the first cutting reel system 106 is disposed at an angular position within a preferred range from $1 \times 10^1$ to $9 \times 10^1$ degrees about the axis of the tumbler, measured in the direction of rotation of the tumbler from the vertically lowest angular position of the tumbler. More particularly, in this embodiment the preferred range is from $2 \times 10^1$ to $8 \times 10^1$ degrees. More particularly still, in this embodiment the preferred range is from $3\times10^1$ to $7\times10^1$ degrees. More particularly still, in this embodiment the preferred range is from $4\times10^1$ to $6\times10^1$ degrees. More particularly still, in this embodiment the first cutting reel system 106 is disposed at an angular position of $5\times10^1$ degrees about the axis of the tumbler, measured in the direction of rotation of the tumbler from the vertically lowest angular position of the tumbler.

In this embodiment, the plurality of cutting reel systems further comprises at least a third cutting reel system 126 adjacent the tumbler 102, which in this embodiment is disposed between the first cutting reel system 106 and the second cutting reel system 108. More particularly, in this embodiment an axis of the third cutting reel system 126 is disposed vertically beneath the central axis of the tumbler 102. The third cutting reel system 126 tends to encounter at least some buds 122 with leaves 124 that have only been partly flattened by a comparatively smaller number of new collisions with other buds after landing in the landing zone 110 than the collisions experienced by the buds churning in the rising zone 116, and is therefore capable of achieving cuts of intermediate depth between the deeper cuts of the second cutting reel system 108 and the shallower, finer cuts of the first cutting reel system 106. Alternatively, in other embodiments the third cutting reel system may be omitted, or in other embodiments still, more than three cutting reels may be provided.

Advantageously, the combination of the first, second and third cutting reel systems and their respective angular positions tends to achieve new synergistic effects that go beyond the mere increase in throughput rate that one might expect from increasing the number of cutting reels. Quantitatively, the present inventors have found that such an embodiment tends to more than quadruple, rather than merely triple, the achievable throughput rate of plant material 114 through the tumbler 102. The improved throughput is attributable at least in part to the unconventional positioning of the second cutting reel system 108 in the landing zone 110, whose deeper leaf cuts permit more leaf material to be trimmed per rotation of the tumbler than a conventionally placed cutting reel system. Qualitatively, the complementary combination of the deeper, coarser leaf cuts of the second cutting reel system 108, with the shallower, finer cuts of the first cutting reel system 106, and optionally with the intermediate cuts of the third cutting reel system 126, result in an improved quality of the resulting product, not only in terms of its leaf-trimming quality and visual appearance, but also in terms of its desired active ingredients. For example, in embodiments in which the plant material 114 is medical marijuana, causing the plant material 114 to undergo fewer rotations in the tumbler tends to advantageously decrease the percentage of trichomes containing the desired cannabinoid molecules that are inadvertently shaken off of the buds 122 during the tumbling process. Thus, not only do the improvements in throughput rate achieved by the present embodiment allow more plant material 114 to be trimmed in a given time period, they also improve the resulting quality, both visual and medicinal, of the resulting trimmed plant material product.

Cutting Reel Systems

Referring to FIGS. 3 and 4A-4C, the first cutting reel system 106 is shown in greater detail. In this embodiment, the second cutting reel system 108 and the third cutting reel system 126 are structurally identical to the first cutting reel system 106, and differ in their operational effects only by virtue of their different respective angular positions relative to the tumbler 102, as discussed above in connection with the landing zone 110 and the rising zone 116 of the tumbler 102. Accordingly, the second and third cutting reel systems 108 and 126 are not described in further detail herein.

In this embodiment, the first cutting reel system 106 includes a rotatable cutting reel 302 having a plurality of helical cutting blades 304, and a flexible cutting knife 306 having a cutting edge 402 interposed between the cutting reel 302 and the tumbler 102, such that plant material protruding radially outward through the tumbler 102 is trimmed by scissor action of the helical cutting blades 304 bearing against the cutting edge 402 of the flexible cutting knife 306 as the blades rotate.

In this embodiment, the flexible cutting knife 306 differs from the rigid cutting knives that are typically used in conventional plant trimming machines. The present inventors have found that the use of a flexible cutting knife 306 allows for closer spacing between the tumbler and cutting reels, which in turn facilitates the use of smaller-diameter cutting reels than conventional cutting reels, which in turn facilitates the unconventional placement of a plurality of cutting reels around a single tumbler.

In this embodiment, the flexible cutting knife 306 is composed of 716 surgical stainless steel. Advantageously, therefore, the flexible cutting knife 306 does not rust, unlike the standard tool steel that is commonly used for conventional rigid cutting knives. In this embodiment, the first cutting reel system 106 is designed to ideally accommodate a flexible cutting knife having a thickness ranging from 15 to 30 mils (0.015 to 0.030 inches), which is considerably thinner than the typical conventional rigid knife thickness of 80 mils or more.

In this embodiment, the flexible cutting knife 306 is secured in place by a knife holder 308. More particularly, in this embodiment the flexible cutting knife 306 includes a sharp-edged elongated metal cutting knife having a rectangular cross-section, and is press-fit between opposing jaws 404 and 406 of the knife holder 308 along with a seal 310. In this embodiment the seal 310 includes a pair of elongated compressible cylindrical sealing members composed of a material normally used for O-rings, such as neoprene or other elastomeric materials. In this embodiment the seal 310 and the flexible cutting knife 306 are sandwiched between the jaws 404 and 406 of the knife holder 308, with the jaw 406 bearing against an upper surface of the flexible cutting knife 306 and with the seal 310 compressed between a lower surface of the flexible cutting knife 306 and the jaw 404. When press-fit in this manner, a first portion of the width of the flexible cutting knife 306 is secured between the jaws 404 and 406 of the knife holder 308, and a second, larger portion of the width of the flexible cutting knife 306 extends out of the knife holder 308 and over a portion of the cutting reel 302. The lower edge of the flexible cutting knife 306 that is distal from the knife holder 308 forms the cutting edge 402 that the helical blades bear against and slide along to trim the leaves 124 protruding from the tumbler 102 during operation.

The present embodiment includes a removable knife assembly 400, which includes the flexible cutting knife 306 and seal 310 press-fit into the knife holder 308. In this embodiment, the knife assembly 400 is easily removable from the first cutting reel system 106 for cleaning, sharpening or other maintenance, or replacement (and likewise, as discussed in connection with the housing below, the entire first cutting reel system 106 is also easily removable).

In this regard, the knife holder 308 has an elongated inner leg 408 and an elongated outer leg 410 surrounding a generally V-shaped opening 412, which narrows as it extends from its lower opening toward its narrower neck 414, which is adjacent a cylindrical knife-mounting receptacle 416. In this embodiment, the knife assembly 400 also includes a knife-mounting dowel 418. At the time of initial assembly, the knife-mounting dowel 418 is press-fit into the knife-mounting receptacle 416 at the left end of the knife assembly 400, so that a portion of the dowel protrudes axially outwardly from the left end of the knife holder 308. In this embodiment, such a dowel is mounted only at the left end and not at the right end of the knife assembly 400, and serves to ensure that the knife holder 308 cannot be accidentally mounted on the wrong side of the first cutting reel system 106 with the cutting edge 402 of the knife pointing in the wrong direction.

To facilitate easy attachment and detachment of the knife assembly 400 to and from the rest of the first cutting reel system 106, in this embodiment the first cutting reel system 106 includes a left outer bearing block 420 and a right outer bearing block 422, at opposite left and right ends of the first cutting reel system 106. In this embodiment, the left bearing outer bearing block 420 includes a left knife-mounting protrusion 424, which extends in an axially inward direction from the left end of the cutting reel system, and likewise the right outer bearing block 422 includes a right knife-mounting protrusion 426, which similarly extends in an axially inward direction from the right end of the cutting reel system. The knife-mounting protrusions 424 and 426 are shaped as mirror images of each other, each having a shape complementary to that of the V-shaped opening 412 of the knife holder 308. Immediately above the knife-mounting protrusion 424, the left outer bearing block 420 includes a dowel groove 428 which extends axially outwardly past the axially outward end of the knife-mounting protrusion 424, and which can accommodate the knife-mounting dowel 418 therein, but the right outer bearing block 422 lacks any such groove to accommodate the dowel 418. To install the knife assembly 400 onto the rest of the first cutting reel system 106, the knife assembly 400 is simply lowered down onto the rest of the first cutting reel system 106, so that the left knife-mounting protrusion 424 is snugly received in the V-shaped opening 412 of the knife holder 308 at the left end of the knife assembly, the knife-mounting dowel 418 is received in the groove 428 of the left outer bearing block 420, and the right knife-mounting protrusion 426 is snugly received in the V-shaped opening 412 at the right end of the knife assembly. If the operator attempts to incorrectly install the knife assembly 400 on the wrong side of the first cutting reel system 106 with the cutting edge 402 pointing in the wrong direction, by erroneously attempting to mount the left end of the cutting assembly onto a second right mounting protrusion 430 of the right outer bearing block 422, the user will be prevented from doing so by the fact that the right outer bearing block 422 lacks any accommodating groove for the protruding knife-mounting dowel 418, which will therefore collide against a top surface of the right outer bearing block 422, preventing the knife assembly 400 from being lowered into place. Conversely, to remove the knife assembly 400, a user can merely lift the knife assembly 400 upward and away from the knife-mounting protrusions 424 and 426 of the left and right bearing blocks. As discussed in greater detail below, in operation, when a lid of the apparatus 100 is closed, the lid and housing co-operate to secure both the cutting reel systems and their respective knife assemblies in place, but when the apparatus is not in use and the lid is open, the cutting reel systems can be freely removed by simply lifting them out of place, and likewise, the knife assemblies can be detached from their respective cutting reel systems in a similarly easy manner by simply lifting them.

In this embodiment, the cutting reel 302 itself also differs from those that are typically used in conventional plant trimming machines, in two main ways.

First, in this embodiment the cutting reel 302 is a hubless cutting reel, in which the plurality of helical cutting blades 304 are mounted directly to a central shaft 432 of the reel. In contrast, conventional plant trimming machines typically employ hubbed cutting reels, in which a plurality of radially extending annular discs or hubs are mounted to the central shaft at spaced apart intervals along the axial length of the reel, and the blades are then mounted to the hubs rather than being mounted directly to the shaft.

Second, in this embodiment the plurality of helical cutting blades 304 have a higher helicity than those typically employed in conventional plant trimming machines. In conventional machines, each helical blade typically makes no more than one-half of one complete rotation around the central shaft as it extends axially from one end of the shaft to the other. In contrast, in this embodiment the plurality of helical cutting blades 304 are more tightly wound, with each extending for more than the typical one-half rotation around the cutting reel 302 over its axial length. More particularly, in this embodiment each of the helical blades extends for one and one-half rotations around the cutting reel 302 over its axial length. Thus, in this embodiment the plurality of helical cutting blades 304 includes first, second, third, fourth, fifth and sixth cutting blades 434, 436, 438, 440, 442 and 444, respectively. To the extent that FIG. 3 appears to show nine helical cutting blade surfaces simultaneously in contact with the flexible cutting knife 306, this is because the first, second and third cutting blades 434, 436 and 438 complete 1.5 rotations around the central shaft 432 as they traverse the length of the first cutting reel system, and thus each one of the cutting blades 434, 436 and 438 is in simultaneous contact with the flexible cutting knife 306 at two different axially spaced apart locations.

In this embodiment, the apparatus 100 further includes an anti-dive mechanism shown generally at 450, to prevent the flexible cutting knife 306 from blocking rotation of the helical cutting blades 304. More particularly, in this embodiment the anti-dive mechanism 450 includes a support ring 452 adjacent a leading end of the flexible cutting knife 306 at which each of the helical cutting blades 304 first contacts the flexible cutting knife 306, the support ring 452 being configured to maintain a fixed spacing between the leading end of the flexible cutting knife 306 and an axis of the cutting reel 302. More particularly still, in this embodiment the leading end of the flexible cutting knife 306 is its left end, and the support ring 452 is mounted on the central shaft 432 of the cutting reel 302 at its left end, immediately adjacent to and axially outward from the left distal ends of the helical cutting blades 304. The axial length of the flexible cutting knife 306 is slightly longer than the axial lengths of the helical cutting blades 304, so that the flexible cutting knife 306 extends axially outward past the left ends of the helical cutting blades 304 and over the support ring 452. The support ring 452 is an annular metal disc that maintains contact between the far left distal end of the cutting edge 402 of the flexible cutting knife 306 during operation, thereby preventing the left corner of the flexible cutting knife 306 from flexing downward into the path of the helical blades 304 and blocking the blades 304, which would potentially jam or damage the cutting reel 302. In this regard, such undesirable diving of the flexible cutting knife 306 into the path of the blades 304 can be fully prevented by providing only a single support ring 452 at the leading end of the knife: once a particular one of the blades 304 successfully begins to contact the cutting edge 402 of the flexible cutting knife 306 just axially inward from the support ring 452, that blade will continue to maintain rolling contact with the cutting edge 402, as the point of contact between the helical blade and the cutting edge of the knife traverses the axial length of the cutting reel 302 as the reel rotates.

In this embodiment, the first cutting reel system 106 further includes a filler knife assembly shown generally at 460, including a filler knife 462 and a seal 464 sandwiched between jaws 466 and 468 of a filler knife holder 470. In this embodiment, the filler knife holder 470 is a mirror image of the knife holder 308, and the seal 464 includes a pair of elongated compressible cylindrical sealing members identical to those of the seal 310. However, in this embodiment the filler knife 462 differs from the flexible cutting knife 306: more particularly, in this embodiment the filler knife 462 does not extend past the jaws of the filler knife holder 470 into the path of the helical cutting blades 304. In this embodiment, the filler knife holder 470 has a V-shaped opening 472 and a cylindrical knife-mounting receptacle 474. At the time of assembly, a dowel 477 is press-fit into the left end of the cylindrical knife-mounting receptacle 474, so that a portion of the dowel 477 protrudes axially outward from the left end of the filler knife holder 470. In this embodiment, the left outer bearing block 420 further includes a second left mounting protrusion 476, and a second dowel groove 478 extending above and axially outwardly past the axially outward end of the protrusion 476, to accommodate the dowel 477. Thus to mount the filler knife assembly 460 to the first cutting reel system 106, the filler knife assembly 460 is merely lowered down into place, with the second left mounting protrusion 476 and the second right mounting protrusion 430 being received in the V-shaped groove 472, and the dowel 477 received in the second dowel groove 478.

In this embodiment, although the filler knife 462 is not used for trimming, the filler knife assembly 460 co-operates with a lid of the apparatus 100 to assist in securing the first cutting reel system 106 in place during operation, and the easy removability of the filler knife assembly 460 facilitates cleaning or maintenance of the cutting reel 302 when the first cutting reel system 106 is removed, as discussed below in connection with the lid and housing.

In this embodiment, to initially assemble the first cutting reel system 106, the knife assembly 400 and the filler knife assembly 460 are separately assembled as described above. At the left end of the first cutting reel system, the support ring 452 is mounted to the central shaft 432 of the cutting reel 302. A bearing 480, which in this embodiment is a radial ball bearing, is sandwiched between the left outer bearing block 420 and a left inner bearing block 482, which are tightly secured together using a plurality of bolts 484 and a plurality of nuts 486, with the bolts being received through a plurality of corresponding holes 488 and 490 defined through the left outer and left inner bearing blocks, respectively. This bearing assembly comprising the left inner and left outer bearing blocks and the bearing 480 is then mounted onto the central shaft 432 of the cutting reel 302, adjacent and immediately axially outward from the support ring 452, so that the bearing 480 allows the central shaft 432 and hence the cutting reel 302 to rotate freely within the non-rotating left inner and left outer bearing blocks. A drive gear 492 is then mounted to a drive gear mounting portion 494 of the left end of the central shaft 432. In this embodiment, the drive gear mounting portion 494 is not cylindrical but rather, has an approximately D-shaped cross-section, and likewise an inner surface of the drive gear 492 has an approximately D-shaped cross-sectional shape complementary to that of the drive gear mounting portion 494 of the central shaft 432, so that the drive gear 492 is rotationally locked in unison with the cutting reel 302. A retaining ring 496 is then used to retain the drive gear, the bearing assembly and the support ring on the central shaft 432, by locking the retaining ring 496 around a retaining ring slot 498 defined circumferentially around the left end of the central shaft 432. The assembly of the right end is similar but simpler because neither a drive gear nor an anti-dive mechanism such as the support ring 452 is included at the right end. A bearing 446, which in this embodiment includes a radial ball bearing identical to the bearing 480, is sandwiched between the right outer bearing block 422 and a right inner bearing block 448, which are secured together with a plurality of bolts 454 and a plurality of nuts 456. The resulting bearing assembly is mounted over the right end of the central shaft 432, and secured to the shaft by locking a retaining ring 497 around a retaining ring slot 499 defined circumferentially around the right end of the central shaft 432. The knife assembly 400 is then lowered into place with the knife-mounting protrusions 424 and 426 of the outer bearing blocks 420 and 422 received in the V-shaped opening 412 of the knife holder 308 and the dowel 418 received in the dowel groove 428 of the left outer bearing block 420. Similarly, the filler knife assembly 460 is lowered into place with the knife-mounting protrusions 476 and 430 of the outer bearing blocks 420 and 422 received in the V-shaped opening 472 of the filler knife holder 470 and the dowel 477 received in the second dowel groove 478 of the left outer bearing block 420.

Lower Housing and Cutting Reel Receptacles

Figure 5:
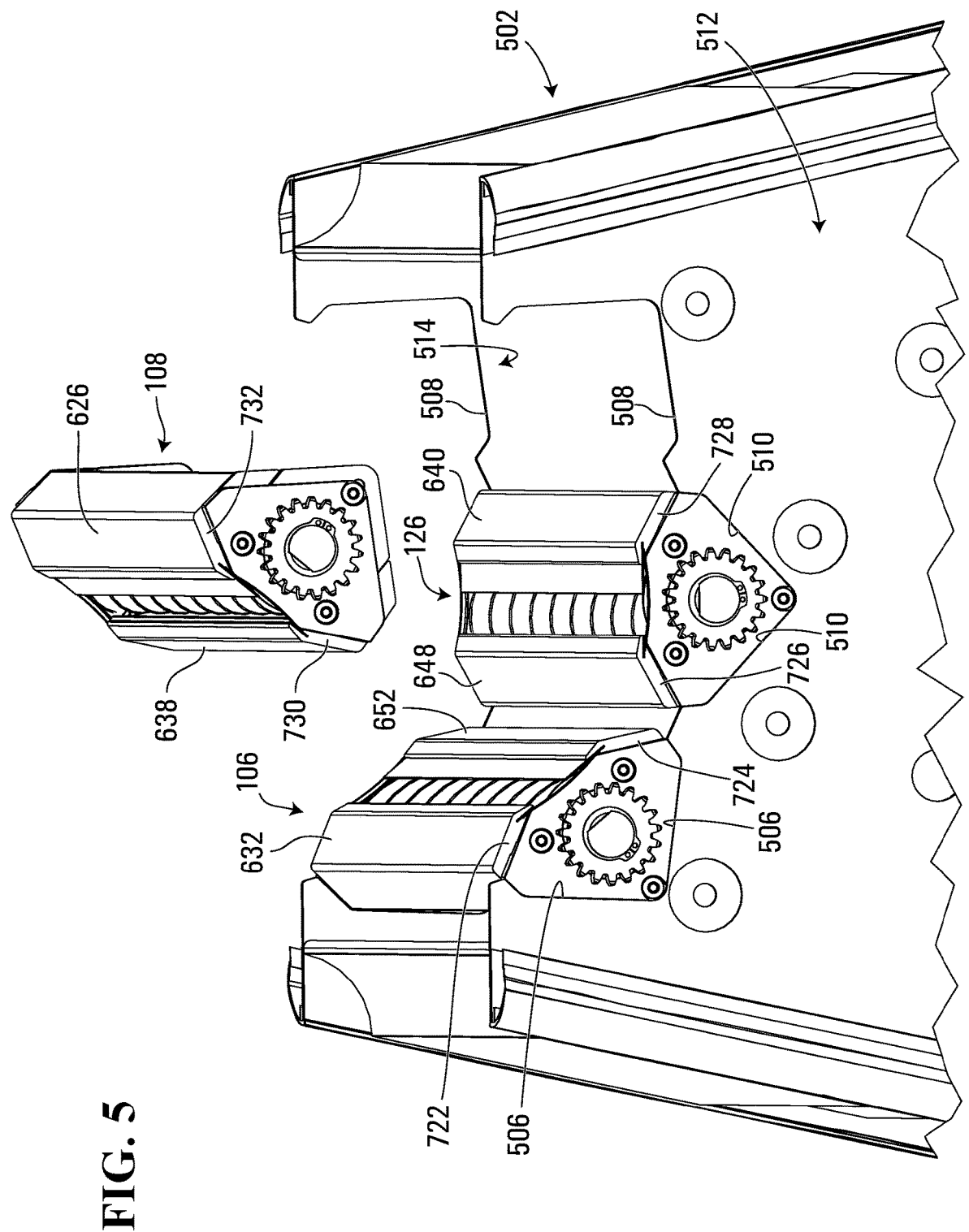
FIG. 5 is a left-top view of the apparatus of FIG. 2 shown with one of the plurality of cutting reel systems of FIGS. 1A-1D removed for cleaning, omitting a lid and tumbler assembly, plant material inlet and exhaust chutes, a left outer housing sidewall, drive gears and pulleys for ease of illustration.

Referring to FIGS. 2 and 5, in the present embodiment, the apparatus 100 includes a housing shown generally at 500. In this embodiment, the housing 500 has at least one receptacle configured to removably receive at least one cutting reel system to rest unsecured therein, as discussed immediately below. As discussed thereafter, the housing 500 also includes a closeable lid having retention structure configured to operably secure the at least one cutting reel system in the at least one receptacle when the lid is closed.

In this embodiment, the housing 500 includes a lower housing portion 502 and an upper housing portion 504 shown in FIG. 2. In FIG. 5, the upper housing portion is omitted for ease of illustration.

Referring to FIG. 5, in this embodiment, when the lid (upper housing portion 504) is open, each of the cutting reel systems 106, 108 and 126 rests freely in the lower housing portion 502, unsecured. More particularly, in this embodiment the lower housing portion 502 includes a first reel assembly receptacle 506, a second reel assembly receptacle 508 and a third reel assembly receptacle 510. Each one of the reel assembly receptacles 506, 508 and 510 includes a pair of recesses, defined in both a left inner sidewall 512 and a right inner sidewall 514 of the lower housing portion, so as to accommodate respective left and rights ends of each respective cutting reel system. More particularly, each of the reel assembly receptacles 506, 508 and 510 has a shape complementary to that of the left and right outer bearing blocks 420 and 422 of the first cutting reel system 106, which as noted above are identical to the left and right outer bearing blocks of the second and third cutting reel systems 108 and 126. When each of the cutting reel systems is installed, it is placed in its respective reel assembly recess and rests snugly but unsecured therein, with its respective drive gear 492 engaged with a corresponding gear that is rotationally mounted immediately outside and adjacent the left sidewall 512. When a lid of the apparatus 100 is open, the cutting reel systems 106, 108 and 126 are held down only by gravity and can thus be easily removed for cleaning or maintenance.

Upper Housing: Lid and Tumbler Assembly

Figure 6:
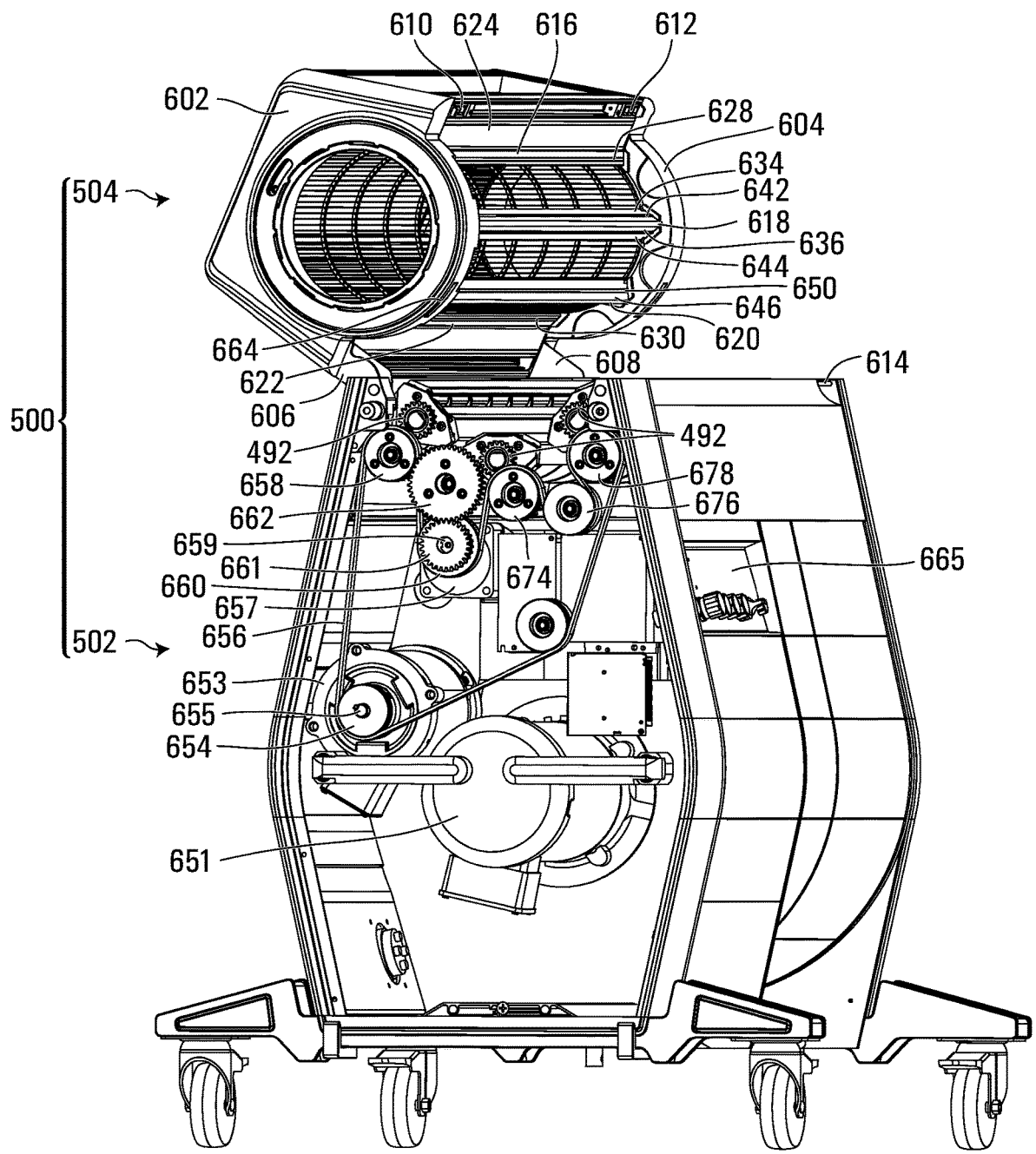
FIG. 6 is a left-front view of the apparatus of FIG. 2 shown with a lid and tumbler assembly in an open position, omitting various components including a left outer housing sidewall and a left motor housing sidewall for ease of illustration.
Figure 7:
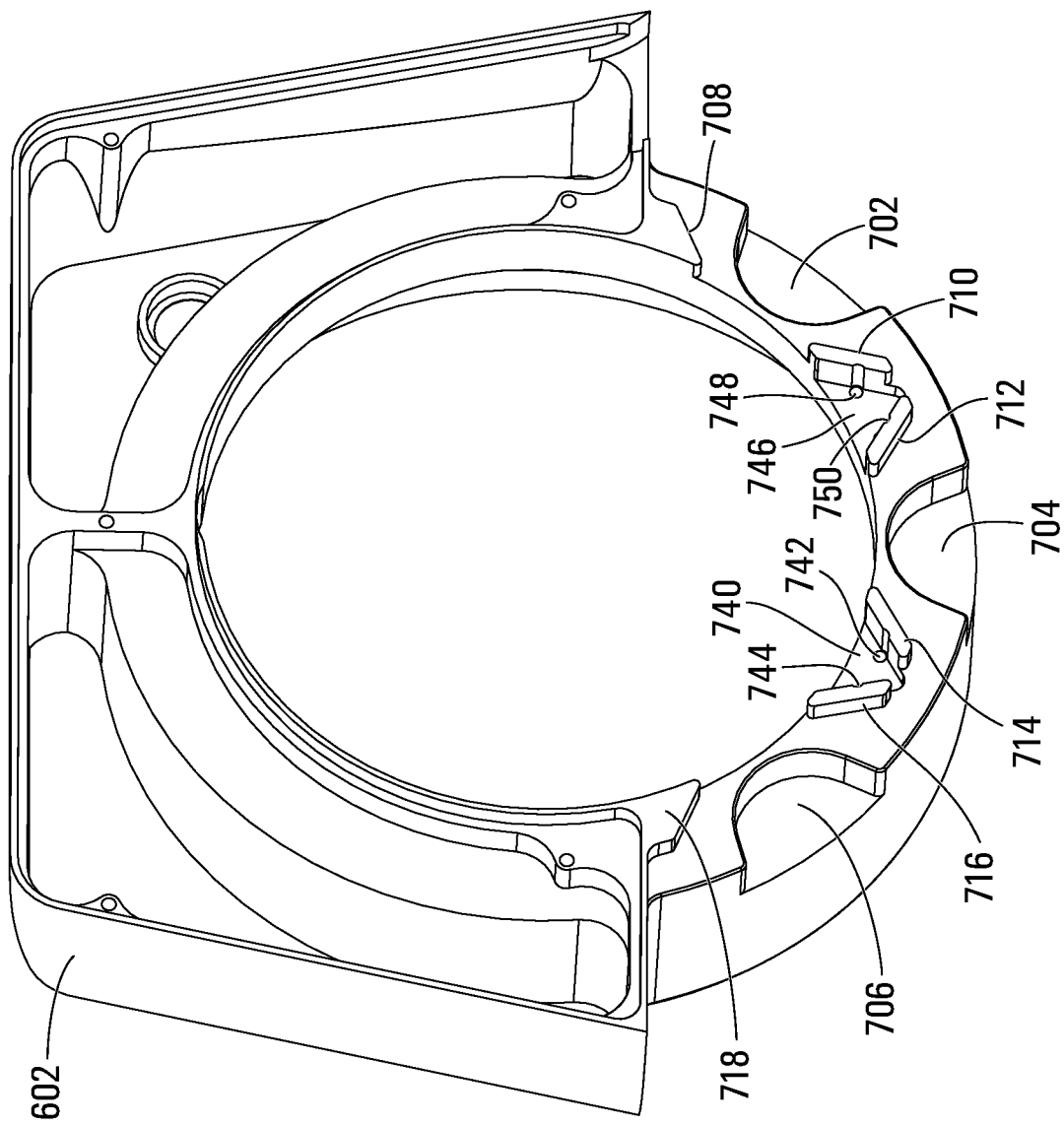
FIG. 7 is a right front view of a left end block of the lid and tumbler assembly shown in FIG. 6.

Referring to FIGS. 2, 6 and 7, in this embodiment the upper housing portion 504 acts as both a lid and tumbler assembly, within which the tumbler 102 is rotationally mounted. For convenience the upper housing portion 504 may also be referred to as the lid 504 herein. In this embodiment, the lid 504 is closeable and has retention structures configured to operably secure the plurality of cutting reel systems 104 in the receptacles 506, 508 and 510 of the housing 500 when the lid 504 is closed.

Regarding the tumbler assembly, in the present embodiment, the tumbler 102 is an unconventional corded tumbler, as described in commonly owned co-pending U.S. patent application Ser. No. 15/476,412 filed on Mar. 31, 2017 and titled, "Harvesting Tumbler," which is hereby incorporated herein by reference. Thus, in contrast to conventional tumblers which are typically formed by cutting elongated slots out of a planar sheet of metal and bending the metal into a cylinder, in this embodiment the cylindrical wall of the tumbler 102 is formed from a plurality of circumferentially spaced, resiliently tensionable cord segments, under sufficient tension to maintain a cylindrical shape during tumbling operation. Advantageously, the present inventors have found that the use of such a corded tumbler facilitates closer spacing between the cutting reel systems and the tumbler, thereby facilitating the use of multiple smaller cutting reel systems. Alternatively, a conventional sheet metal tumbler may be substituted.

The upper housing portion 504 of the present embodiment is generally similar to the tumbler assembly described in the above-cited co-pending U.S. application Ser. No. 15/476, 412, except that in the present embodiment, the upper housing portion 504 incorporates novel retention structures described below, to co-operate with the lower housing portion 502 to easily secure the first, second and third cutting reel systems 106, 108 and 126 in place for operation of the apparatus 100, and to easily unsecure them for cleaning or maintenance, simply by closing and opening a lid of the apparatus 100.

As noted above, in this embodiment the entire upper housing portion 504 acts as both a lid and a tumbler assembly for the apparatus 100. In this embodiment the upper housing portion 504 includes a modified left end cap 602 and a modified right end cap 604, each equipped with a retaining mechanism to secure the first, second and third cutting reel systems in place when the upper housing portion 504 is in a closed position for operation, as discussed in greater detail below in connection with FIG. 7. In this embodiment the upper housing portion 504 includes respective hinges 606 and 608, which attach the upper housing portion 504 to the lower housing portion 502, and which allow the upper housing portion 504 to open by pivoting about an axis extending between the left and right sides of the apparatus 100 near the top rear edge of the lower housing portion 502. To ensure that the upper housing portion 504 stays closed during operation, in this embodiment the upper housing portion 504 is equipped with latch mechanisms 610 and 612, which engage with two corresponding latch mechanisms on the lower housing portion 502, one of which is shown at 614 mounted at the top front of the right sidewall of the lower housing portion 502, and the other of which is concealed in the view of FIG. 6. In this embodiment, the latch mechanisms 610 and 612 are spring-loaded, so that they automatically lock the lid under the force of gravity when a user closes the lid, but require a user to apply an axially inward force to unlatch the lid to open it.

Referring to FIGS. 5, 6 and 7, the left end cap 602 is shown in greater detail in FIG. 7, the right end cap 604 being a mirror image thereof. In this embodiment, an axially inward facing side of the left end cap 602 has three axially outwardly extending recesses 702, 704 and 706. When the lid (upper housing portion 504) is closed, the recess 702 accommodates the drive gear 492 of the first cutting reel system 106, and the recesses 704 and 706 similarly accommodate the identical drive gears of the third cutting reel system 126 and the second cutting reel system 108, respectively. In addition, in this embodiment the axially inward facing side of the left end cap 602 has six axially inwardly extending reel retention protrusions 708, 710, 712, 714, 716 and 718. In this embodiment, when the lid (upper housing portion 504) is closed, the reel retention protrusion 708 engages with a top rear surface 722 of the left outer bearing block 420 of the first cutting reel system 106, and the reel retention protrusion 710 engages with a top front surface 724 of the left outer bearing block 420 of the first cutting reel system 106. Similarly, the reel retention protrusions 712 and 714 engage with respective top rear and top front surfaces 726 and 728 of the left outer bearing block of the third cutting reel system 126, and the reel retention protrusions 716 and 718 engage with respective top rear and top front surfaces 730 and 732 of the second cutting reel system 108. Likewise, in this embodiment the right end cap 604 has similar recesses and reel retention protrusions, which can be seen in the view of FIG. 6, and which are mirror images of the recesses 702, 704 and 706 and reel retention protrusions 708, 710, 712, 714, 716 and 718.

Thus, in this embodiment, when the lid (upper housing portion 504) is closed, the reel retention protrusions 708, 710, 712, 714, 716 and 718 firmly hold the first, third and second cutting reel systems 106, 126 and 108 in place for operation.

Referring back to FIGS. 5 and 6, as discussed in greater detail above in connection with the first cutting reel system 106, it will be recalled that in the present embodiment, the knife assembly 400 and filler knife assembly 460 are not secured to the first cutting reel system 106, but rather, are lowered into place so that they can be simply lifted up away from the remainder of the first cutting reel system 106 for removal if desired. Likewise, the identical knife assemblies of the second and third cutting reel systems 108 and 126 are similarly unsecured. In this embodiment, the reel retention protrusions 708, 710, 712, 714, 716 and 718 of the left end cap 602 do not extend sufficiently far enough in the axially inward direction to hold the knife assemblies in place during operation, nor do the corresponding mirror image reel retention protrusions of the right end cap 604 (although in an alternative embodiment they may be extended axially inward for this purpose). Instead, in this embodiment, to secure the knife assemblies in place, the upper housing portion 504 includes first, second, third and fourth additional knife retention structures 616, 618, 620 and 622 shown in FIG. 6.

In this embodiment, the first knife retention structure 616 is a downwardly and inwardly angled, radially inner portion of a front lid support bar 624. In this embodiment, a radially outermost portion of the front lid support bar 624 houses the latch mechanisms 610 and 612, and a radial mid-portion of the front lid support bar engages with the top front surface of the lower housing portion 502 when the lid (upper housing portion 504) is closed. When the lid is closed, the first knife retention structure 616 is downwardly and inwardly angled at the same angle as an upper surface 626 of a knife assembly of the second cutting reel system 108, and includes a seal 628 for tightly sealing against the upper surface 626. In this embodiment, the seal 628 is an elongated cylindrical portion of compressible elastomeric material such as that used for O-rings, extending through a semi-cylindrical groove across the length of the first knife retention structure 616, with a portion of its diameter protruding out of the groove. When the lid (upper housing portion 504) is closed, the first knife retention structure 616 is pressed firmly against the upper surface 626 of the knife assembly of the second cutting reel system 108, compressing the seal 628.

In this embodiment, the fourth knife retention structure 622 is similar to the first knife retention structure 616, and is an inwardly and downwardly angled portion of a rear lid support bar, having a compressible seal 630 similar to the seal 628. When the lid (upper housing portion 504) is closed, the fourth knife retention structure 622 presses firmly against an upper surface 632 of the filler knife assembly 460 of the first cutting reel system 106, compressing the seal 630.

Referring to FIGS. 5, 6 and 7, in this embodiment, the second and third knife retention structures 618 and 620 each serve to retain two knife assemblies in place when the lid of the apparatus 100 is closed. More particularly, in this embodiment each of the second and third knife retention structures 618 and 620 includes a generally triangular retention bar extending between the left and right end caps 602 and 604 of the upper housing 504. At the left end cap 602 shown in FIG. 7, a left end of the second knife retention structure 618 rests in a V-shaped recess 740 defined between the reel retention protrusions 714 and 716, and a pair of locking pins (not shown) protruding axially outwardly from the outermost left end of the second knife retention structure 618 are received in corresponding pinholes 742 and 744 which extend axially outwardly into the left end cap 602, thereby rigidly securing the left end of the second knife retention structure 618 to the left end cap 602. Similarly, a left end of the third knife retention structure 620 rests in a V-shaped recess 746 defined between the reel retention protrusions 710 and 712, and a pair of locking pins (not shown) protruding axially outwardly from the outermost left end of the third knife retention structure 620 are received in corresponding pinholes 748 and 750 to lock the left end of the third knife retention structure 620 to the left end cap 602. In this embodiment, the right ends of the second and third knife retention structures 618 and 620 are similarly retained and secured in the right end cap 604.

In this embodiment, the second knife retention structure 618 has first and second retention surfaces 634 and 636 which intersect to form a V-shape. When the lid of the apparatus 100 is closed, the first retention surface 634 is positioned and angled to tightly engage with a top surface 638 of the filler knife assembly of the second cutting reel system 108, and the second retention surface 636 is positioned and angled to tightly engage with a top surface 640 of the knife assembly of the third cutting reel system 126. The first and second retention surfaces 634 and 636 include respective seals 642 and 644, which in this embodiment are compressible seals similar to the seal 628 discussed above, partly contained within respective grooves in the retention surfaces so as to be compressed between the retention surfaces and the knife assembly top surfaces when the lid is closed.

In this embodiment, the third knife retention structure 620 is identical to the second knife retention structure 618. Thus, when the lid is closed, a first retention surface 646 of the third knife retention structure tightly engages with a top surface 648 of the filler knife assembly of the third cutting reel system 126, compressing a seal 650 between the two engaged surfaces, and similarly, a second retention surface having a second seal (not visible in the view of FIG. 6 but identical to the second retention surface 636 and seal 642 of the second knife retention structure 618) tightly engages with a top surface 652 of the knife assembly 400 of the first cutting reel system 106.

Thus, in the present embodiment, to remove any of the cutting reel systems 106, 108 and 126 for cleaning or maintenance, a user must merely unlatch the latch mechanisms 610 and 612 and lift up the lid (upper housing portion 504). The user can then simply lift any one of the cutting reel systems out of the lower housing portion 502. The user can replace the cutting reel systems for operation by simply lowering them back into their receptacles 506, 508 and 510 defined in the lower housing portion 502, engaging the drive gear 492 of each cutting reel system with its corresponding drive gear mounted on the left sidewall of the housing. To secure the cutting reel systems and their respective knife assemblies for operation of the apparatus 100, the user must merely close the lid (upper housing portion 504), so that the left and right end caps 602 and 604 secure the outer bearing blocks of the cutting reel systems, and the first, second, third and fourth knife retention structures 616, 618, 620 and 622 secure the knife assemblies of the cutting reel systems in place.

Vacuum

Referring to FIGS. 2 and 6, for operation, the trimming apparatus 100 includes a vacuum system 202 mounted in a corresponding vacuum receptacle defined within the lower housing portion 502, which is used to apply a suction force to the tumbler 102, to assist in pulling leaves downward through the openings in the tumbler wall into the path of the plurality of cutting reel systems 106, 108 and 126 as the tumbler rotates.

Typically, the suction of the vacuum system is applied by a simple electric fan, which may be driven by the same motor that drives the tumbler or by a different motor. Additionally, a vacuum system for a plant trimming machine typically includes a separator of some kind to remove particulate plant matter from the suctioned air and prevent clogging of the vacuum. In this embodiment, the vacuum system 202 of the apparatus 100 includes an unconventional vacuum separator system as described in commonly owned co-pending U.S. patent application Ser. No. 15/635,955 filed on Jun. 28, 2017 and titled, "Centrifugal Gas Separator," which is hereby incorporated herein by reference. Alternatively, a conventional vacuum separator typically used for plant trimming machines, such as a cyclonic separator or a Thien separator vacuum, may be substituted. Alternatively, filtration may be theoretically substituted for separation, but this is a less desirable approach due to the expected need for frequent cleaning or replacement of filters.

In this embodiment, the vacuum system 202 is equipped with a receptacle 208 for receiving and accumulating solid particulate material or liquid centrifugally extracted from the suctioned air.

Motor and Drive System

As noted above, in this embodiment each of the plurality of cutting reel systems is gear-driven.

To achieve this, referring to FIGS. 2 and 6, in this embodiment the apparatus 100 further includes a drive motor system 204, housed within a corresponding motor system receptacle of the lower housing portion 502. In this embodiment, the drive motor system 204 includes three electric motors 651, 653 and 657, which are used to drive the vacuum system 202, the plurality of cutting reel systems 104, and the tumbler 102 with a tumbler cleaning brush, respectively, although alternatively two or more of these components may be driven by the same motor if desired.

In this embodiment the electric motor 651, which drives the vacuum system 202, includes a 5 horsepower motor, mounted in the lower housing portion 502. In this embodiment, a right end of a driven central axis of the motor 651 protrudes axially inward through a sidewall (not shown) of the vacuum system 202 to rotate an electric fan (not shown) to thereby cause the vacuum system 202 to apply suction to the tumbler 102.

In this embodiment, the motor 653, which drives the plurality of cutting reels 104, includes a ¾ horsepower motor having a main drive pulley 654, which is connected to and rotationally locked with a drive shaft 655 of the motor 653. Motor-driven rotation of the main drive pulley 654 drives a belt 656 connected to various other pulleys and gears as described below.

In this embodiment, the motor 653 drives the main drive pulley 654 in a counter-clockwise direction as seen from the left view of FIG. 6. This causes the belt 656 to rotate a first cutting reel pulley-and-gear member 658 counter-clockwise. The pulley-and-gear member 658 includes an axially outer pulley portion driven by the belt 656 and an axially inward gear portion that is rotationally locked with the pulley portion. The axially inward gear portion of the pulley-and-gear member 658 engages with the drive gear 492 of the first cutting reel system 106 to rotate the drive gear 492, and hence the cutting reel 302, in a clockwise direction as seen in FIG. 6.

In this embodiment, the counter-clockwise rotation of the main drive pulley 654 as seen in FIG. 6 further causes clockwise rotation of a idler pulley 660, which is mounted on a drive shaft 659 of the motor 657 that drives the tumbler 102. However, unlike the pulley-and-gear member 658, the idler pulley 660 includes an inner radial bearing that allows it to rotate freely around the drive shaft 659, independently of the rotation of the drive shaft 659 caused by the motor 657. Thus, the drive belt 656 effectively bypasses the motor 657 without being driven by it, and is driven only by the motor 653.

Returning to FIG. 6, in this embodiment the counter-clockwise rotation of the main drive pulley 654 further causes the belt 656 to rotate a third cutting reel pulley-and-gear member 674 counter-clockwise. The pulley-and-gear member 674 includes an axially outer pulley portion driven by the belt 656 and an axially inward gear portion that is rotationally locked with the pulley portion. The axially inward gear portion of the pulley-and-gear member 674 engages with the drive gear 492 of the third cutting reel system 126 to rotate its drive gear 492, and hence its cutting reel 302, in a clockwise direction as seen in FIG. 6.

In this embodiment, the counter-clockwise rotation of the main drive pulley 654 further causes the belt 656 to rotate a pulley 676 clockwise and a pulley-and-gear member 678 counter-clockwise as seen from the left view of FIG. 6. The pulley-and-gear member 678 includes an axially outer pulley portion driven by the belt 656 and an axially inward gear portion that is rotationally locked with the pulley portion. The axially inward gear portion of the pulley-and-gear member 678 engages with the drive gear 492 of the second cutting reel system 108 to rotate its drive gear 492, and hence its cutting reel 302, in a clockwise direction as seen in FIG. 6. The belt 656 also drives a pulley 680 counter-clockwise as seen in FIG. 6.

Referring to FIGS. 1C, 1D, 2 and 6, in this embodiment the motor 657 that drives the tumbler 102 includes a ⅛ horsepower motor. As noted above, the belt 656 that drives the rotation of the cutting reel assemblies is effectively isolated from the motor 657, by the internal radial bearing structure of the idler pulley 660, which allows the idler pulley 660 to rotate freely about the motor drive shaft 659 independently of the action of the motor 657. In this embodiment, a first tumbler driving gear 661 is rotationally locked to the shaft 659 so that rotation of the shaft 659 by the motor 657 drives rotation of the first tumbler driving gear 661. From the left view of FIG. 6, the motor 657 drives the first tumbler driving gear 661 clockwise, which in turn drives a second tumbler driving gear 662 counter-clockwise. In this embodiment, the second tumbler driving gear 662 protrudes through a gear slot 664 shown in FIG. 6, to drive a left tumbler driven gear 666 of the tumbler 102. Thus, from the left view of FIG. 6, the counter-clockwise rotation of the second tumbler driving gear 662 drives the tumbler driven gear 666, and hence the tumbler 102, in a clockwise direction.

It will be recalled that in the present embodiment, the tumbler 102 is an unconventional corded tumbler, whose cylindrical wall is formed from a plurality of spaced apart resiliently tensionable cord segments, all under tension. Although such a tumbler has numerous advantages over conventional tumblers formed by cutting slots out of sheet metal and rolling it into a cylinder, it lacks the torsional rigidity of a conventional sheet metal tumbler. Therefore, merely causing the left end of the tumbler 102 to rotate is not sufficient to rotate the corded tumbler 102 as a uniform cylinder. To address this, in the present embodiment, the upper housing portion 504 further includes a left synchronization shaft gear (not shown) engaged with the tumbler driven gear 666 to drive a synchronization shaft 668 shown in FIG. 2. At its right end, the synchronization shaft 668 is equipped with a right synchronization shaft gear (not shown) identical to the left synchronization shaft gear. The right synchronization shaft gear is engaged with a right tumbler driven gear 670 which is identical to the left tumbler driven gear 666. Thus, the motor-driven clockwise rotation of the left tumbler driven gear 666 as seen from the left side of the apparatus 100 causes counter-clockwise rotation of the synchronization shaft 668 which causes the right tumbler driven gear 670 to rotate clockwise in synchronization with the left tumbler driven gear 666. In this embodiment, the upper housing portion 504 further includes a cleaning brush shaft gear (not shown) engaged with the right tumbler driven gear 670, so that the rotation of the right tumbler driven gear 670 also causes rotation of a cleaning brush shaft 672 shown in FIG. 2, to spin a cleaning brush mounted on the brush shaft adjacent an upper front region of the tumbler 102, to thereby continuously clean the tumbler 102 during operation.

In this embodiment, the motor 651, 653 and 657 are all connected to a control panel 665 that includes separate respective manual controls for separately controlling the fan rotation speed and hence the suction provided by the vacuum system 202, the rotation speed of the plurality of cutting reel systems 104 and the rotation speed of the tumbler 102. If desired, the control panel 665 may include an electronic control board (not shown) equipped with a processor (not shown) configured to control the vacuum system 202, the plurality of cutting reel systems 104 and the tumbler 102. The control board may be equipped with one or more communications interfaces such as Wi-Fi and Bluetooth, for example, to permit the apparatus 100 to be controlled by a separate device such as a smartphone or a computer in wireless communication with the apparatus 100.

Operation

Referring to FIGS. 1B, 2 and 6, for operation of the apparatus 100 of the present embodiment, the lid (upper housing portion 504) is closed and latched to secure the cutting reel systems and their knife assemblies in place, as described above.

The drive motor system 204 is activated as discussed above. Rotation of the motor 651 drives a fan (not shown) of the vacuum system 202, causing the vacuum system to suck ambient air downward through the tumbler 102 and through the plurality of cutting reel systems 104, to assist the leaves 124 of the buds 122 of the plant material 114 in protruding further downward through the openings in the tumbler 102 for more effective trimming by the cutting reel systems. Rotation of the motor 653 causes the main drive pulley 654 to rotate counter-clockwise as seen from the left view of FIGS. 2 and 6, thereby causing the first, second and third cutting reel systems 106, 108 and 126 to rotate clockwise as seen from the left. Rotation of the motor 657 causes its drive shaft 659 and hence the first tumbling driving gear 661 to rotate clockwise as seen from the left view of FIG. 6, causing the second tumbler driving gear 662 to rotate counter-clockwise, which in turn causes the left tumbler driven gear 666 and hence the tumbler 102 to rotate clockwise. The clockwise rotation of the tumbler driven gear 666 causes counter-clockwise rotation of the synchronization shaft 668 which causes the right tumbler driven gear 670 to rotate clockwise, synchronously with the left tumbler driven gear 666. The clockwise rotation of the right tumbler driven gear 670 then drives the rotation of the cleaning brush shaft 672 counter-clockwise to clean the tumbler 102 as it rotates.

An illustrative method of trimming plant material then includes rotating the tumbler 102 through which plant material 114 is being axially propagated while rotationally tumbling, and operating the plurality of cutting reel systems 104 adjacent the tumbler 102. Operating the plurality of cutting reel systems adjacent the tumbler includes operating the first cutting reel system 106 adjacent the tumbler 102, and operating the second cutting reel system 108 adjacent the landing zone 110 of the tumbler, the landing zone being the angular range about an axis of the tumbler within which plant material 114 tends to land on the tumbler 102 after tumbling through the central volume 112 of the tumbler 102.

Regarding the axial propagation of the plant material through the apparatus 100 during tumbling operation, in this embodiment the plant material 114 to be trimmed is propagated axially from a right end toward a left end of the apparatus 100. The plant material 114 is gravitationally fed into the tumbler 102 via a hopper chute 210 shown in FIG. 2. To facilitate axial propagation through the tumbler, in this embodiment the housing 500 includes a support stand 206, which in this embodiment is a wheeled support stand for ease of transportation, and has an adjustable right-side height that can be raised to a higher vertical height than the left side of the housing, so as to incline the tumbler 102 slightly downward from right to left, so that gravity causes the plant material to gradually propagate in the axial direction as it rotates in the tumbler. Alternatively, axial propagation may be achieved in other ways without inclining the tumbler: for example, one such way involves providing helical guides extending along an inside surface of the tumbler, which redirect some of the plant material's instantaneous circumferential or tangential momentum into axial momentum when the plant material collides with the helical guides. After propagating across the axial length of the tumbler 102, the trimmed plant material exits the apparatus 100 via an outlet chute 212.

Referring back to FIG. 1B, as the plant material 114 axially propagates through the tumbler 102, the tumbler 102 is rotated at a sufficiently high rotational frequency to cause the plant material 114 to bifurcate into the first tumbling stream 118 and the second tumbling stream 120 shown in FIG. 1B, but not at a sufficiently high rotational frequency that centrifugal force would cause the plant material 114 to adhere to the tumbler 102 throughout an entire 360 degree rotation. As discussed in greater detail above in connection with the landing zone 110, in this embodiment the second cutting reel system 108 is advantageously positioned adjacent the landing zone 110 of the tumbler 102, thereby ideally positioning the second cutting reel system 108 to trim the buds 122 of the second tumbling stream 120, which as discussed above tend to downwardly collide with the tumbler 102 at relatively high velocity and with their leaves 124 spread out. This enables the second cutting reel system 108 to make generally deeper, coarser cuts of the leaves 124 than the first and third cutting reel systems 106 and 126, which tend to encounter the buds at lower impact velocities and with their leaves in a more flattened, less spread out state as a result of continuous rolling collisions. The first, second and third cutting reel systems thus co-operate to synergistically achieve and improved and more efficient trimming operation, in which the second cutting reel system 108 predominantly handles deeper, coarser cuts, and the first cutting reel system 106 provides comparatively finer cuts, with the third cutting reel system providing intermediate results. As noted above, the present inventors have found that such a method tends to more than quadruple the throughput rate of a typical conventional single tumbler, single cutting reel trimming machine.

Generally, the throughput rate tends to depend on multiple variables, including, for example, the moisture content of the plant material 114 (ranging from wet to dry), the species of the plant material, the sub-species or strain of the plant material, the extent (if any) to which the buds 122 of the plant material have been prepared before trimming, and the desired trimming level (ranging from shaggy to tightly trimmed). For example, for one illustrative set of the above variables, the apparatus 100 may operate the tumbler 102 at a rotation rate of about 60 rpm, and each of the plurality of cutting reels 104 at a rotation rate of about 1750 rpm, with the tumbler inclined at an angle between about 0 and 2 degrees, to achieve a throughput rate of about 160 pounds (wet weight) per hour of plant material 114 passing through the tumbler 102.

Alternatives

As discussed above in connection with FIGS. 3 and 4A-4D, in embodiments that employ a flexible cutting knife such as the knife 306 instead of a conventional, thicker, rigid cutting knife, it is advantageous for the apparatus 100 to include an anti-dive mechanism, such as the support ring 452 discussed above, to prevent the flexible cutting knife 306 from blocking rotation of the helical cutting blades 304 of the cutting reel 302. In other embodiments, however, the support ring 452 may be omitted and the flexible cutting knife may incorporate a different form of anti-dive mechanism.

Figure 3:
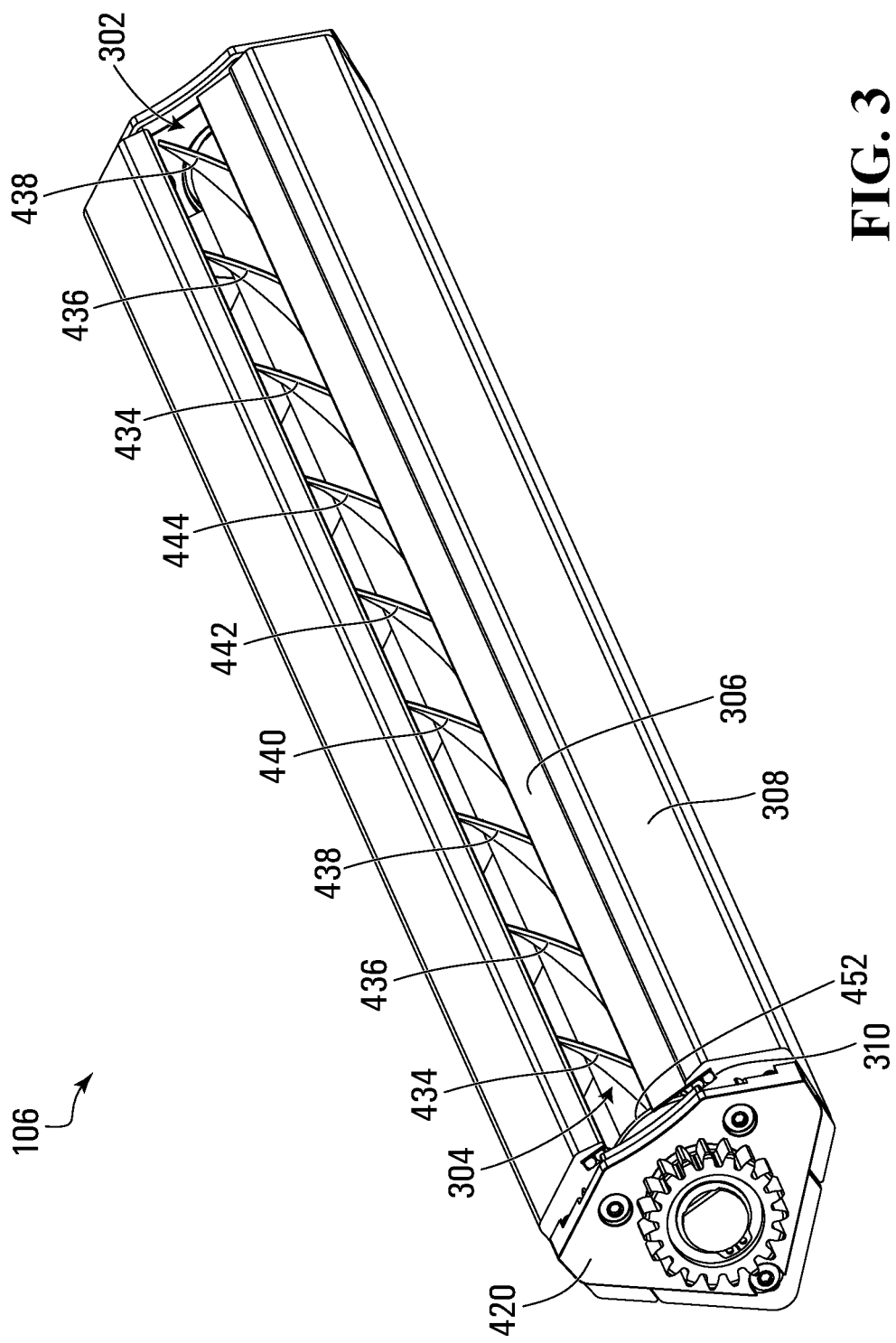
FIG. 3 is a left-front-top view of a first cutting reel system of the plurality of cutting reel systems of FIGS. 1A-1D, including an exemplary anti-dive mechanism.
Figure 4A:
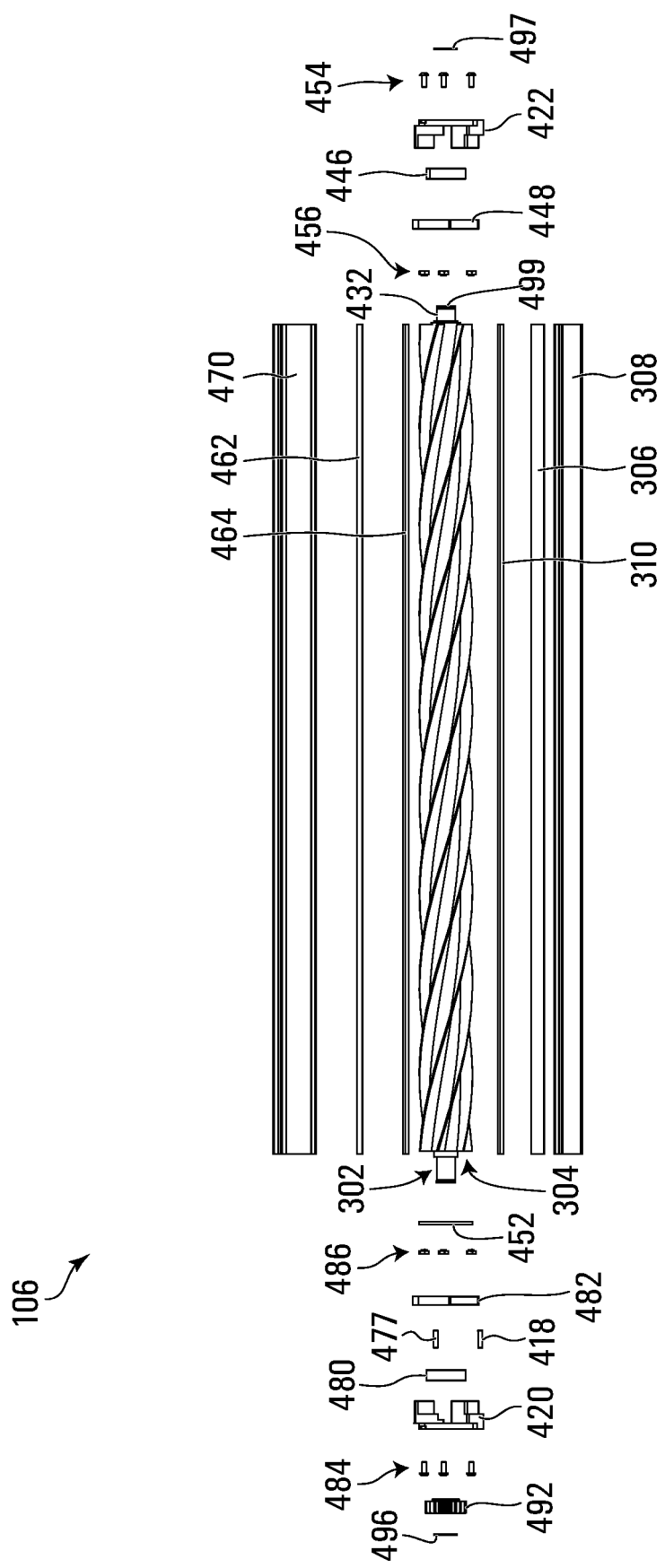
FIG. 4A is a top exploded view of the first cutting reel system of FIG. 3.
Figure 4B:
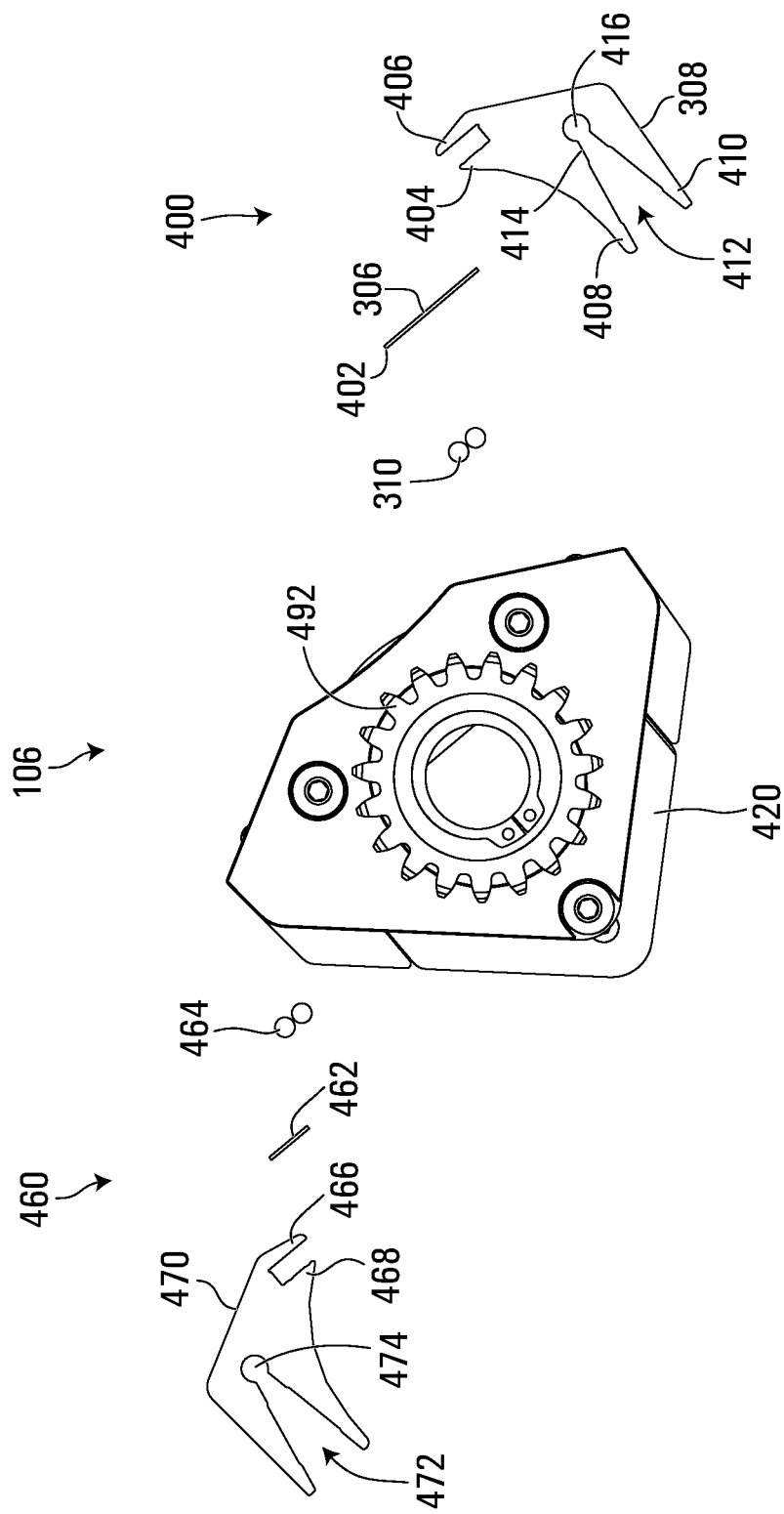
FIG. 4B is a left side exploded view of the first cutting reel system of FIG. 3.
Figure 4C:
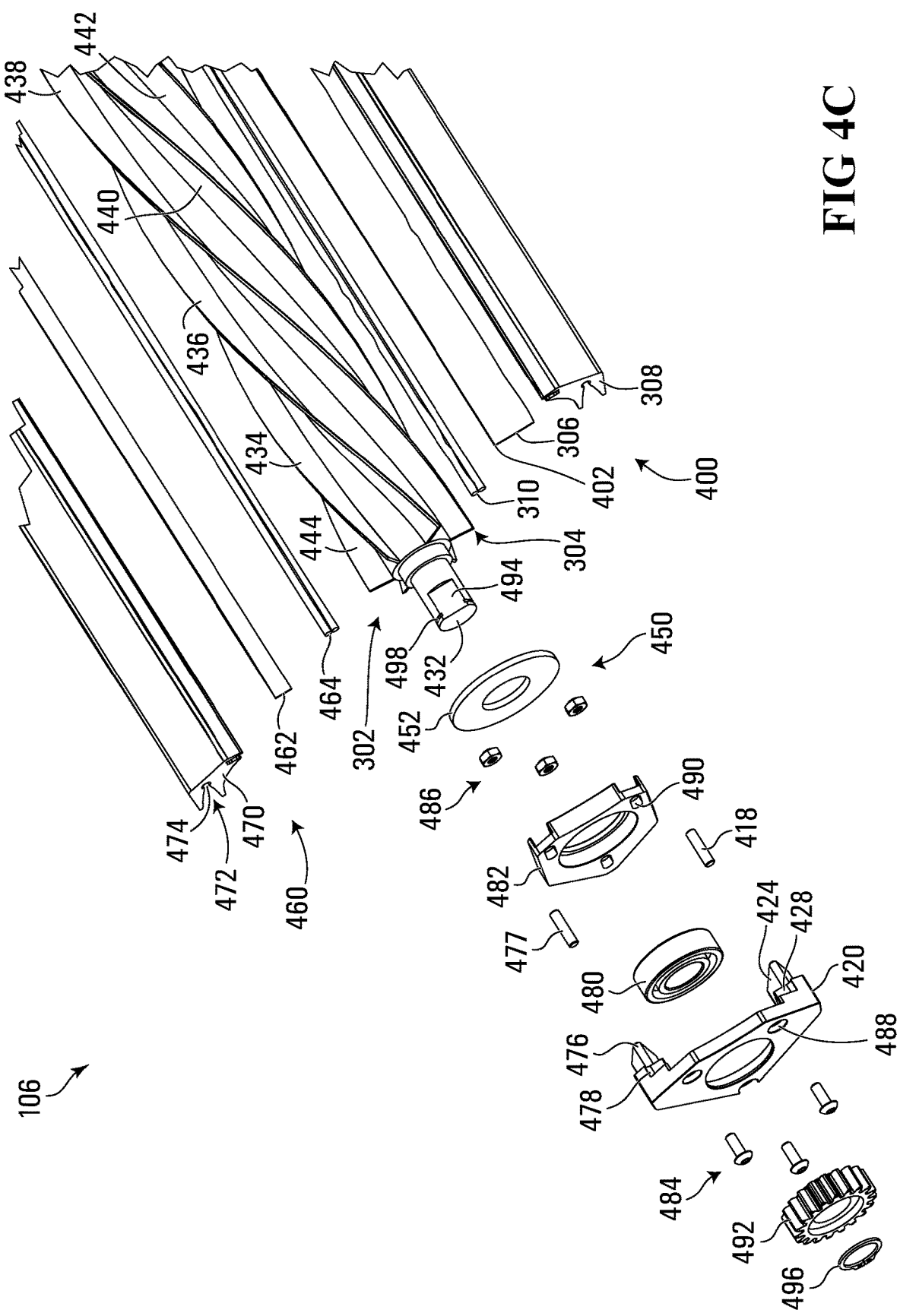
FIG. 4C is a detail exploded view of a left end portion of the first cutting reel system of FIG. 3.
Figure 8:
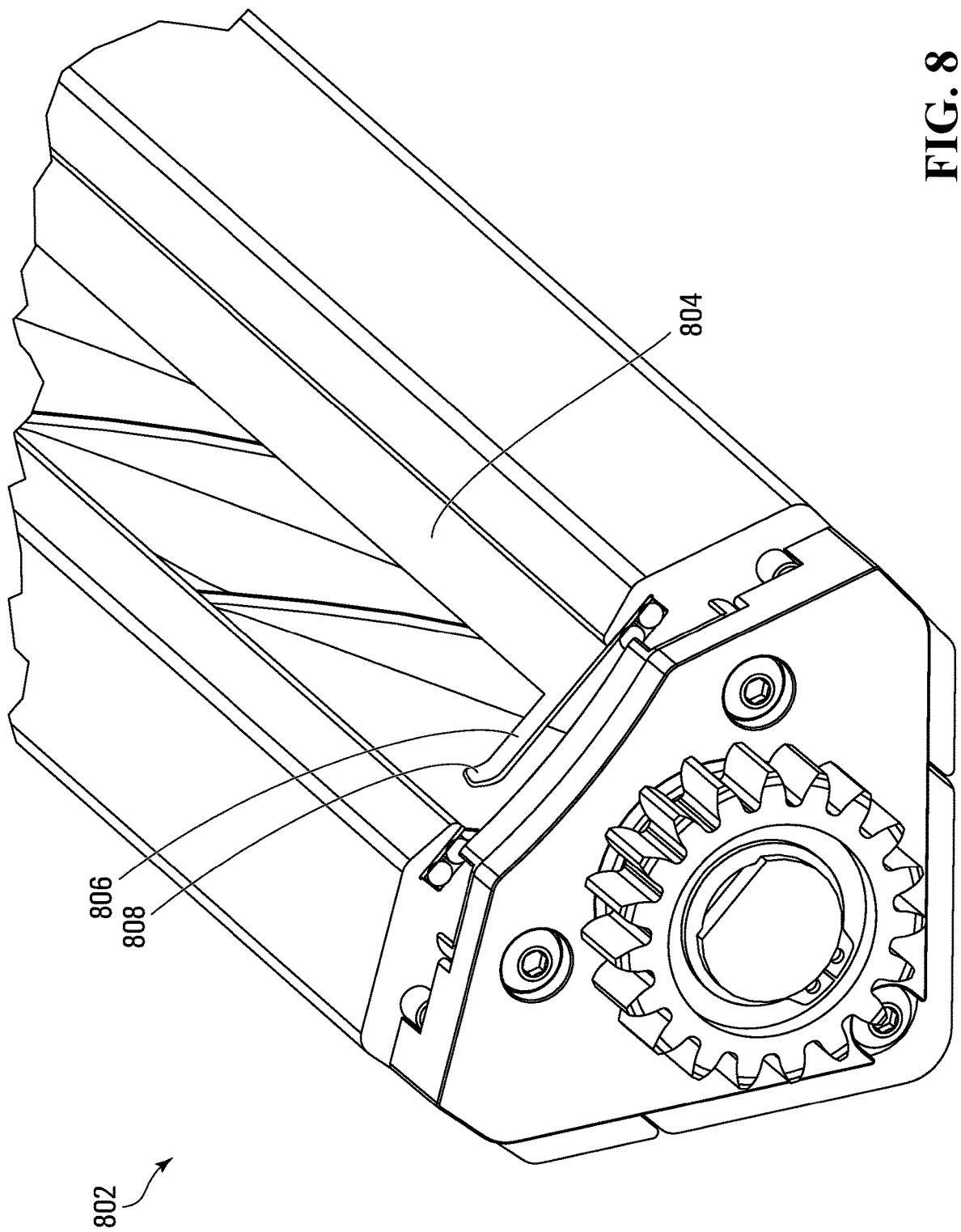
FIG. 8 is a detail view of a left end portion of the first cutting reel system of FIG. 3, modified by substituting a flexible cutting knife incorporating an anti-dive mechanism according to a second illustrative embodiment.

For example, referring to FIGS. 3 and 8, a cutting reel system according to a second illustrative embodiment is shown generally at 802 in FIG. 8. The cutting reel system 802 omits the support ring 452 of the first cutting reel system 106. As an alternative anti-dive mechanism, the cutting reel system 802 has a flexible cutting knife 804 having a protrusion 806 at a leading end of the flexible cutting knife 804 at which each of the helical cutting blades 304 first contacts the flexible cutting knife 804. The protrusion 806 extends past a cutting edge of the flexible cutting knife 804 in a direction generally opposite to a tangential direction of rotation of the helical cutting blades 304 as they bear against the flexible cutting knife 804. Apart from the protrusion 806, the flexible cutting knife 804 is identical to the flexible cutting knife 306. Advantageously, because the protrusion 806 extends tangentially past the cutting edge of the flexible cutting knife 804, there is typically sufficient clearance between a distal tip 808 of the protrusion 806 and the helical cutting blades 304 that even if the flexible cutting knife 804 flexes slightly downward, each helical cutting blade 304 will still successfully pass underneath the protrusion 806 at the point where the blade begins to engage against the cutting edge of the flexible cutting knife 804, at the left end of the cutting reel system 802. Once a given helical cutting blade 304 successfully passes underneath the protrusion 806 and begins to engage with the cutting edge of the flexible cutting knife 804 at its leading end (in this case the left end), the blade itself will prevent the flexible cutting knife from diving downward into its path for the remainder of the blade's travel across the reel, or in other words for the remainder of the travel of the point of contact between that blade and the cutting edge of the knife as the point of contact travels axially from the left end to the right end of the cutting reel due to the reel's clockwise rotation as seen in the view of FIG. 8.

In the embodiment of FIG. 8, the distal tip 808 of the protrusion 806 is also curved upward, i.e. further away from the rotational path of the helical cutting blades 304, so that the protrusion 806 and its distal tip 808 form a hockey-stick shape with the distal tip 808 resembling a blade of the stick. Such a shape tends to advantageously increase the likelihood that, even if the protrusion 806 dives downward into the path of one of the helical cutting blades 304 at the leading end of the cutting reel system 802, the collision between the blade and the curved distal tip 808 will successfully deflect the protrusion 806 upward and out of the path of the blade so that the blade successfully engages with the cutting edge of the knife.

Figure 9:
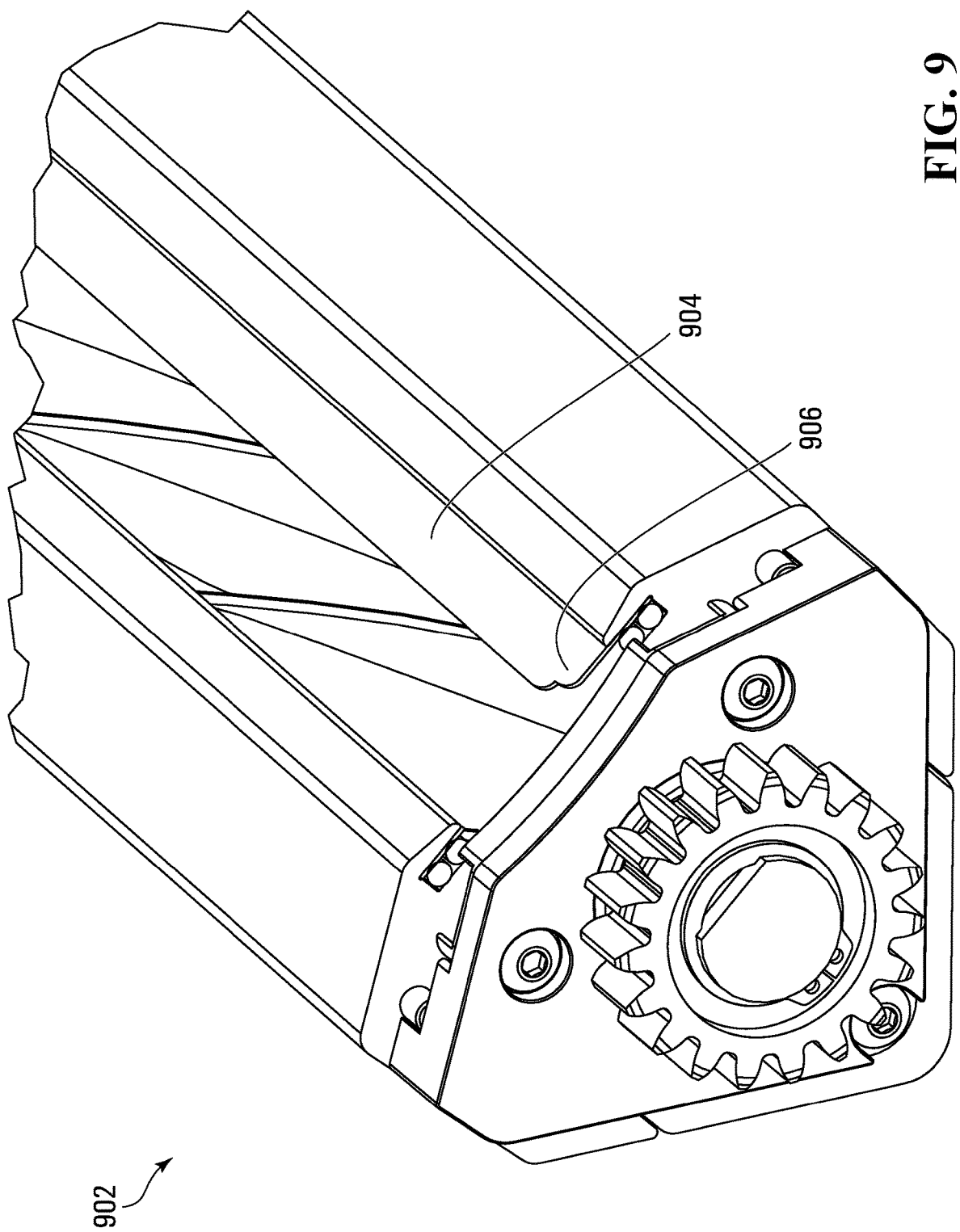
FIG. 9 is a detail view of a left end portion of the first cutting reel system of FIG. 3, modified by substituting a flexible cutting knife incorporating an anti-dive mechanism according to a third illustrative embodiment.

Similarly, referring to FIGS. 3 and 9, a cutting reel system according to a third illustrative embodiment is shown generally at 902 in FIG. 9. Compared to the first cutting reel system 106 of FIG. 3, in the cutting reel system 902 the support ring 452 has been omitted. Instead, in this embodiment the anti-dive mechanism includes a bent leading corner 906 of a flexible cutting knife 904 at a leading end of the flexible cutting knife 904 at which each of the helical cutting blades 304 first contacts the flexible cutting knife 904. The bent leading corner 906 is bent out of a plane of the flexible cutting knife in a direction away from the cutting reel of the cutting reel system 902. Advantageously, even if the flexible cutting knife 904 inadvertently dives downward, at the leading end where each helical blade first engages with the cutting edge of the cutting knife 904, the collision between the helical blade and the bent leading corner 906 will deflect the flexible cutting knife 904 upward and out of the path of the helical cutting blade, thereby allowing the blade to begin its engagement with the cutting edge of the cutting knife, after which the blade itself will prevent the knife from diving into its path as the point of contact between the blade and the cutting edge of the knife travels axially across the knife.

Although a flexible cutting knife provides numerous advantages as described above, including facilitating close placement of multiple cutting reel systems to a single tumbler, alternatively a conventional rigid knife may be substituted. In such rigid-knife embodiments, the anti-dive mechanisms described herein may be omitted, but it may be preferable to provide a mechanism for adjusting or fine-tuning the distance between the tumbler and the cutting reel systems.

Similarly, although a corded tumbler formed from multiple cord segments under tension provides numerous advantages, in other embodiments the tumbler may include a conventional sheet metal tumbler, formed by cutting apertures out of sheet metal and rolling it into a cylinder. Such conventional tumblers tend to be less perfectly cylindrical than the corded tumbler described above, which may increase the required distance between the tumbler and cutting reel systems, thereby diminishing trimming quality. Such embodiments may therefore also benefit from a mechanism for adjusting or fine-tuning the spacing between the tumbler and the cutting reel systems.

In the first embodiment of FIG. 1A, the plurality of cutting reel systems consisted of precisely three cutting reel systems, namely the first, second and third cutting reel systems 106, 108 and 126. In other embodiments, however, the plurality of cutting reel systems may include more than three cutting reel systems, or fewer than three cutting reel systems. For example, a third illustrative embodiment shown in FIG. 10 has a plurality 1002 of cutting reel systems adjacent the tumbler 102, the plurality 1002 consisting of the first and second cutting reel systems 106 and 108 of FIG. 1A. The embodiment of FIG. 10 omits the third cutting reel system 126 of FIG. 1A, and thus provides only two cutting reel systems adjacent the tumbler.

Figure 10:
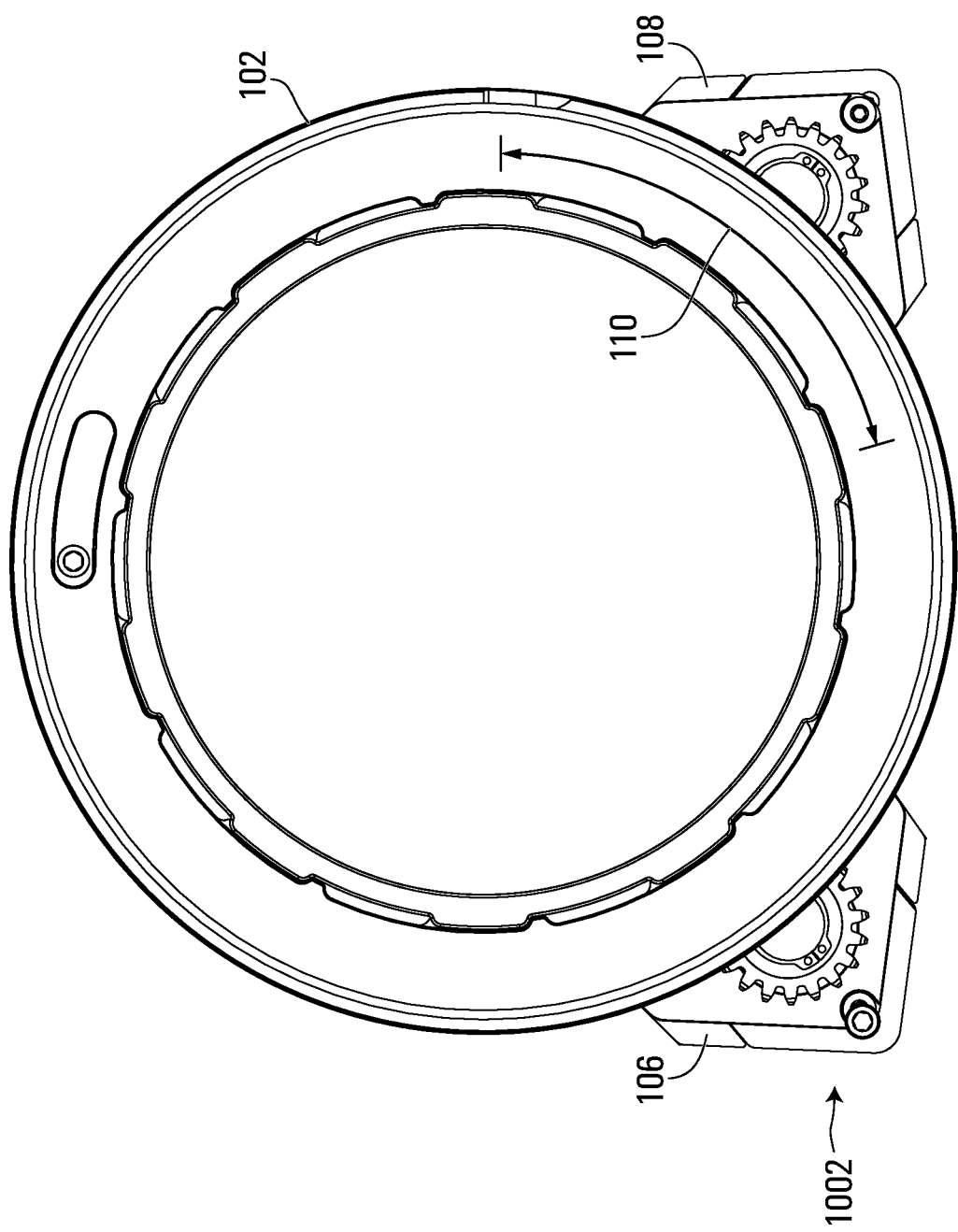
FIG. 10 is a left elevation view of a plurality of cutting reel systems adjacent a rotatable tumbler of an apparatus for trimming plant material according to a fifth illustrative embodiment.

In the two-reel system of FIG. 10, the angular positions of the first and second cutting reel systems 106 and 108 were unchanged compared to their positions in the three-reel system of FIG. 1A. In other embodiments, however, whether two-reel, three-reel or more generally multi-reel, the angular positions of both the first and second cutting reel systems may vary.

For example, in embodiments in which the first cutting reel system is positioned adjacent the rising zone 116 of the tumbler, the first cutting reel system 106 may be positioned at a "higher" angular position adjacent the rising zone 116 than that shown in FIG. 10, such as an angular position of $9 \times 10^1$ degrees, measured in a direction of rotation of the tumbler 102 from a vertically lowest position of the tumbler. In some embodiments, the first cutting reel system 106 is positioned adjacent the rising zone 116 within a preferred angular range of $1 \times 10^1$ to $9 \times 10^1$ degrees, measured in the direction of rotation of the tumbler 102 from the vertically lowest position of the tumbler. In other embodiments, the preferred angular range is $2 \times 10^1$ to $8 \times 10^1$ degrees. In other embodiments, the preferred angular range is $3 \times 10^1$ to $7 \times 10^1$ degrees. In other embodiments, the preferred angular range is $4 \times 10^1$ to $6 \times 10^1$ degrees.

Similarly, the second cutting reel system 108 may be positioned at other angular positions adjacent the landing zone 110 than that shown in FIG. 10. In some embodiments, the second cutting reel system 108 is positioned adjacent the landing zone 110 within a preferred angular range of $1 \times 10^1$ to $9 \times 10^1$ degrees, measured in the direction of rotation opposite to that of the tumbler 102 from the vertically lowest position of the tumbler. In other embodiments, the preferred angular range is $2 \times 10^1$ to $8 \times 10^1$ degrees. In other embodiments, the preferred angular range is $3 \times 10^1$ to $7 \times 10^1$ degrees. In other embodiments, the preferred angular range is $4 \times 10^1$ to $6 \times 10^1$ degrees.

Despite the advantages of the high-helicity hubless reels 302 described above, alternatively conventional cutting reels, including low-helicity hubbed reels, may be substituted. In such embodiments, the rotational rate of the cutting reel may be increased to compensate for its lower blade helicity.

Despite the advantages of the gear-driven configuration of the cutting reel system 106, which facilitates easy removal, alternatively the cutting reel systems may be belt-driven in other embodiments.

In FIG. 6 above, the easy-open retention features of the apparatus 100, which facilitate easy removal of the cutting reel systems and their cutting knife assemblies for cleaning, were described in combination with the inventive configuration of the first embodiment of FIG. 1A, in which a plurality of cutting reel systems are positioned adjacent a single tumbler. However, it is respectfully believed that the easy-open retention features of the apparatus 100 represent an inventive advance over the state of the art, even without consideration of the novel multiple-reel configuration described above. Therefore, the easy-open retention features described above may be advantageously applied to conventional systems that have only a single cutting reel system for each tumbler. The embodiment of FIG. 6 may thus be viewed as one specific example of a more general class of embodiments in which a housing has at least one receptacle configured to removably receive at least one cutting reel system to rest unsecured therein, the housing including a closeable lid having retention structure configured to operably secure the at least one cutting reel system in the at least one receptacle when the lid is closed.

In addition to the embodiments described above, it is contemplated that any one or more features of any particular embodiment may be combined with any one or more features of any other embodiment, except features that have been explicitly described above as being mutually exclusive.

More generally, while specific embodiments of the invention have been described and illustrated, such embodiments should be considered illustrative of the invention only and not as limiting the invention as defined by the accompanying claims.

What is claimed is:

1. An apparatus for trimming plant material, the apparatus comprising:
a rotatable tumbler through which the plant material is to be axially propagated while rotationally tumbling; and
a plurality of cutting reel systems adjacent the tumbler, the plurality comprising:
a first cutting reel system adjacent the tumbler;
a second cutting reel system adjacent a landing zone of the tumbler, the landing zone being an angular range about an axis of the tumbler within which the plant material tends to land on the tumbler after tumbling through a central volume of the tumbler; and wherein the second cutting reel system is disposed at an angular position within a range from $1\times10^1$ to $9\times10^1$ degrees about the axis of the tumbler, measured in the direction opposite to the direction of rotation of the tumbler from the vertically lowest angular position of the tumbler.

2. The apparatus of claim 1 wherein the landing zone includes an angular range from $1\times10^1$ to $9\times10^1$ degrees measured in a direction of rotation that is opposite to a direction of rotation of the tumbler, from a vertically lowest angular position of the tumbler.

3. The apparatus of claim 1 wherein the second cutting reel system is disposed at an angular position within a range from $3\times10^1$ to $7\times10^1$ degrees about the axis of the tumbler, measured in the direction opposite to the direction of rotation of the tumbler from the vertically lowest angular position of the tumbler.

4. The apparatus of claim 1 wherein the second cutting reel system is disposed at an angular position within a range from $4\times10^1$ to $6\times10^1$ degrees about the axis of the tumbler, measured in the direction opposite to the direction of rotation of the tumbler from the vertically lowest angular position of the tumbler.

5. The apparatus of claim 1 wherein the second cutting reel system is disposed at an angular position of $5\times10^1$ degrees about the axis of the tumbler, measured in the direction opposite to the direction of rotation of the tumbler from the vertically lowest angular position of the tumbler.

6. The apparatus of claim 1 wherein each of the plurality of cutting reel systems comprises a rotatable cutting reel having a plurality of helical cutting blades, and a flexible cutting knife having a cutting edge interposed between the cutting reel and the tumbler such that a portion of the plant material protruding radially outward through the tumbler is trimmed by scissor action of the helical cutting blades bearing against the cutting edge of the flexible cutting knife as they rotate.

7. The apparatus of claim 6 wherein the apparatus further comprises an anti-dive mechanism to prevent the flexible cutting knife from blocking rotation of the helical cutting blades.

8. The apparatus of claim 7 wherein the anti-dive mechanism comprises a support ring adjacent a leading end of the flexible cutting knife at which each of the helical blades first contacts the flexible cutting knife, the support ring configured to maintain a fixed spacing between the leading end of the flexible cutting knife and an axis of the cutting reel.

9. The apparatus of claim 7 wherein the anti-dive mechanism comprises a protrusion of the flexible cutting knife at a leading end of the flexible cutting knife at which each of the helical blades first contacts the flexible cutting knife, the protrusion extending past a cutting edge of the flexible cutting knife in a direction generally opposite to a tangential direction of rotation of the helical blades as they bear against the flexible cutting knife.

10. The apparatus of claim 7 wherein the anti-dive mechanism comprises a bent leading corner of the flexible cutting knife at a leading end of the flexible cutting knife at which each of the helical blades first contacts the flexible cutting knife, the bent leading corner being bent out of a plane of the flexible cutting knife in a direction away from the cutting reel.

11. The apparatus of claim 1 wherein the first cutting reel system is adjacent a rising zone of the tumbler, the rising zone being an angular range about the axis of the tumbler within which the plant material tends to maintain contact with the tumbler while rotating and vertically rising before being tumbled.

12. The apparatus of claim 11 wherein the rising zone includes an angular range extending for $1.4\times10^2$ degrees in a direction of rotation of the tumbler from a vertically lowest angular position of the tumbler.

13. The apparatus of claim 11 wherein the first cutting reel system is disposed at an angular position within a range from $1\times10^1$ to $9\times10^1$ degrees about the axis of the tumbler, measured in the direction of rotation of the tumbler from the vertically lowest angular position of the tumbler.

14. The apparatus of claim 11 wherein the first cutting reel system is disposed at an angular position within a range from $3\times10^1$ to $7\times10^1$ degrees about the axis of the tumbler, measured in the direction of rotation of the tumbler from the vertically lowest angular position of the tumbler.

15. The apparatus of claim 11 wherein the first cutting reel system is disposed at an angular position of $5 \times 10^1$ degrees about the axis of the tumbler, measured in the direction of rotation of the tumbler from the vertically lowest angular position of the tumbler.

16. The apparatus of claim 1 wherein the plurality of cutting reel systems further comprises at least a third cutting reel system adjacent the tumbler.

17. The apparatus of claim 16 wherein:
the first cutting reel system is adjacent a rising zone of the tumbler, the rising zone being an angular range about the axis of the tumbler within which the plant material tends to maintain contact with the tumbler while rotating and vertically rising before being tumbled toward the landing zone; and
the third cutting reel system is adjacent the tumbler between the first cutting reel system and the second cutting reel system.

18. The apparatus of claim 16 wherein the plurality of cutting reel systems consists of the first, second and third cutting reel systems.

19. The apparatus of claim 1 wherein the plurality of cutting reel systems consists of the first and second cutting reel systems.

20. The apparatus of claim 6 wherein each of the helical blades extends more than one-half rotation around the cutting reel over an axial length of the cutting reel.

21. The apparatus of claim 20 wherein each of the helical blades extends at least one and one-half rotations around the cutting reel over the axial length.

22. The apparatus of claim 1 wherein each of the plurality of cutting reel systems is gear-driven.

23. The apparatus of claim 1 further comprising a housing having receptacles to removably receive the plurality of cutting reel systems therein, wherein the housing comprises a closeable lid having retention structures configured to operably secure the plurality of cutting reel systems in the receptacles when the lid is closed.

24. A method of trimming plant material, the method comprising:
rotating a tumbler through which the plant material is being axially propagated while rotationally tumbling; and
operating a plurality of cutting reel systems adjacent the tumbler, wherein operating comprises:
operating a first cutting reel system adjacent the tumbler;
operating a second cutting reel system adjacent a landing zone of the tumbler, the landing zone being an angular range about an axis of the tumbler within which the plant material tends to land on the tumbler after tumbling through a central volume of the tumbler; and wherein the second cutting reel system is disposed at an angular position within a range from $1 \times 10^1$ to $9 \times 10^1$ degrees about the axis of the tumbler, measured in the direction opposite to the direction of rotation of the tumbler from the vertically lowest angular position of the tumbler.

* * * * *